US007734684B2

(12) United States Patent
Zeng et al.

(10) Patent No.: US 7,734,684 B2
(45) Date of Patent: Jun. 8, 2010

(54) DIGITAL CONTENT DELIVERY AND VIEWING SYSTEM AND METHOD

(75) Inventors: Jingdong Zeng, Vernon Hills, IL (US); Robert C. Lim, Gurnee, IL (US); Fred Allen, Wheeling, IL (US); Adam P. Yellen, Milwaukee, WI (US); Brian J. Zorc, Conifer, IL (US)

(73) Assignee: Haivision Network Video Inc., Lake Forest, IL (US)

( * ) Notice: Subject to any disclaimer, the term of this patent is extended or adjusted under 35 U.S.C. 154(b) by 1560 days.

(21) Appl. No.: 10/492,440

(22) PCT Filed: Sep. 26, 2003

(86) PCT No.: PCT/US03/30530

§ 371 (c)(1),
(2), (4) Date: Aug. 16, 2004

(87) PCT Pub. No.: WO2004/029771

PCT Pub. Date: Apr. 8, 2004

(65) Prior Publication Data
US 2005/0010963 A1    Jan. 13, 2005

Related U.S. Application Data

(60) Provisional application No. 60/413,853, filed on Sep. 26, 2002, now abandoned, provisional application No. 60/451,762, filed on Mar. 4, 2003, now abandoned.

(51) Int. Cl.
*G06F 15/16* (2006.01)

(52) U.S. Cl. .............. 709/203; 709/202; 725/131; 725/133; 725/139; 725/141

(58) Field of Classification Search .............. 709/203, 709/217, 218, 219, 202; 725/131, 133, 139, 725/141
See application file for complete search history.

(56) References Cited

U.S. PATENT DOCUMENTS

| 6,073,165 | A | 6/2000 | Narasimhan et al. | 709/206 |
|---|---|---|---|---|
| 6,157,945 | A | 12/2000 | Balma et al. | 709/206 |
| 6,507,833 | B1 * | 1/2003 | Hichwa et al. | 707/1 |
| 6,539,237 | B1 | 3/2003 | Sayers et al. | 455/555 |
| 6,795,851 | B1 * | 9/2004 | Noy | 709/218 |
| 7,047,525 | B2 * | 5/2006 | Prunty et al. | 717/137 |
| 2006/0294184 | A1 * | 12/2006 | Agnoli et al. | 709/203 |

OTHER PUBLICATIONS

Preliminary Search Report dated Jun. 30, 2004 for application No. PCT/US03/30530.

\* cited by examiner

*Primary Examiner*—Yves Dalencourt
(74) *Attorney, Agent, or Firm*—Greenberg Traurig, LLP

(57) ABSTRACT

A media distribution system is provided whereby devices on a network are provided with native-mode, optimized content viewers adapted to receive and present digital content provided elsewhere on the network. An agent is downloaded to a device, where it gathers information regarding the device environment and uses that information to identify the appropriate application for that device. The appropriate application for a particular device is then downloaded to the device to enable the device to present the content to a user.

18 Claims, 20 Drawing Sheets

*Fig. 2a*

| Client Device | Hardware | Client Environment Operating System | Browser | Viewer |
|---|---|---|---|---|
| Desktop/Laptop IBM Based Computer | Pentium II | Windows 95 | Internet Explorer | PC1.1 |
| | Pentium II | Windows 98 | Internet Explorer | PC1.2 |
| | Pentium II | Windows 2000 | Internet Explorer | PC1.3 |
| | Pentium II | Windows ME | Internet Explorer | PC1.4 |
| | Pentium II | Windows NT | Internet Explorer | PC1.5 |
| | Pentium III | Windows 95 | Internet Explorer | PC1.6 |
| | Pentium III | Windows 98 | Internet Explorer | PC1.7 |
| | Pentium III | Windows 2000 | Internet Explorer | PC1.8 |
| | Pentium III | Windows ME | Internet Explorer | PC1.9 |
| | Pentium III | Windows NT | Internet Explorer | PC1.10 |
| | Pentium IV | Windows 95 | Internet Explorer | PC1.11 |
| | Pentium IV | Windows 98 | Internet Explorer | PC1.12 |
| | Pentium IV | Windows 2000 | Internet Explorer | PC1.13 |
| | Pentium IV | Windows ME | Internet Explorer | PC1.14 |
| | Pentium IV | Windows NT | Internet Explorer | PC1.15 |
| | Pentium II | Windows 95 | Netscape | PC1.16 |
| | Pentium II | Windows 98 | Netscape | PC1.17 |
| | Pentium II | Windows 2000 | Netscape | PC1.18 |
| | Pentium II | Windows ME | Netscape | PC1.19 |
| | Pentium II | Windows NT | Netscape | PC1.20 |
| | Pentium III | Windows 95 | Netscape | PC1.21 |
| | Pentium III | Windows 98 | Netscape | PC1.22 |
| | Pentium III | Windows 2000 | Netscape | PC1.23 |
| | Pentium III | Windows ME | Netscape | PC1.24 |
| | Pentium III | Windows NT | Netscape | PC1.25 |
| | Pentium IV | Windows 95 | Netscape | PC1.26 |
| | Pentium IV | Windows 98 | Netscape | PC1.27 |
| | Pentium IV | Windows 2000 | Netscape | PC1.28 |
| | Pentium IV | Windows ME | Netscape | PC1.29 |
| | Pentium IV | Windows NT | Netscape | PC1.30 |

| Client Device | Client Environment | | | Viewer |
| --- | --- | --- | --- | --- |
| | Hardware | Operating System | Browser | |
| Desktop/Laptop Mac Based Computer | Power PC G3 | Mac OS 8 | Netscape | Mac1.1 |
| | Power PC G3 | Mac OS 9 | Netscape | Mac1.2 |
| | Power PC G3 | Mac OS X | Netscape | Mac1.3 |
| | Power PC G4 | Mac OS 8 | Netscape | Mac1.4 |
| | Power PC G4 | Mac OS 9 | Netscape | Mac1.5 |
| | Power PC G4 | Mac OS X | Netscape | Mac1.6 |
| | Power PC G3 | Mac OS 8 | Internet Explorer | Mac1.7 |
| | Power PC G3 | Mac OS 9 | Internet Explorer | Mac1.8 |
| | Power PC G3 | Mac OS X | Internet Explorer | Mac1.9 |
| | Power PC G3 | Mac OS 8 | Internet Explorer | Mac1.10 |
| | Power PC G3 | Mac OS 9 | Internet Explorer | Mac1.11 |
| | Power PC G3 | Mac OS X | Internet Explorer | Mac1.12 |

*Fig. 2b*

DIGITAL CONTENT DELIVERY AND VIEWING SYSTEM AND METHOD

CROSS REFERENCE TO RELATED APPLICATION

This application claims the benefit of PCT Application PCT/US03/30530, filed Sep. 26, 2003. PCT Application PCT/US03/30530 claims the benefit of U.S. Provisional Patent Application Ser. No. 60/413,853, filed Sep. 26, 2002, now abandoned, and U.S. Provisional Patent Application Ser. No. 60/451,762, filed Mar. 4, 2003, now abandoned.

FIELD OF THE INVENTION

This invention is directed generally to the field of information distribution and more specifically to systems and methods for automatically providing information-receiving tools to networked devices.

BACKGROUND OF THE INVENTION

Numerous different types of analog and digital networks currently exist throughout the world. These networks are used to communicate information to devices which access such networks, and in many instances, eventually to the people who use such devices to obtain, view or use such information. Many known networks provide numerous users access to digitized information of all types, including raw data, text, graphics, video, audio, and audio-video. Digital information provided over networks is generally contained in files and referred to herein as content or media. The entities or devices which supply the files for others to view or access over such networks are referred to herein as content providers or media providers.

Networks can be classified according to geographic extent. For instance, local area networks (commonly called LANs) generally extend to distances less than one kilometer. Wide area networks (commonly called WANs) extend over distances greater than one kilometer. WANs can comprise many LANs linked together. For instance, the Internet and in particular the World Wide Web (commonly called the Web) is a form of a WAN. LANs can be found in private companies, universities, government agencies, online services, Internet service providers (commonly called ISPs) and other entities.

Networks can also be classified by the protocols they use. Protocols are sets of rules describing how data is transmitted across the network. Example protocols include the Transmission Control Protocol (commonly called TCP) which enables computers to communicate over the Internet, the Internet Protocol (commonly called IP) which ensures that data is sent to the right destination on a network such as the Internet, the Wireless Access Protocol (commonly called WAP) which enables cellular telephones and other wireless devices to access the Internet, and the User Datagram Protocol (commonly called UDP) for transmitting video over the network such as the Internet. Many other protocols exist.

Many networks operate primarily under a client/server model. Servers store and provide the client or client device with media, data, and other files or content the clients request from the servers. The servers are usually powerful computers having one or more processors or Central Processing Units (commonly called CPU's) and suitable storage capabilities. The client or client device is typically a user's desktop or laptop computer, which includes network access software that runs on the user's desktop or laptop computer. One type of software which facilitates access to such networks is commonly called a browser. Other types of physical devices can also function as clients. For example, clients can be cellular telephones, pagers, personal digital assistants (commonly called PDAs), communicators (which are a combination of cellular telephones and PDAs), set-tops used with interactive television, and digital or audio-visual watches. The client typically connects to a server on a network using a modem or other transmitter/receiver over telephone lines, cable or DSL lines, fiber optic lines, wireless communications, or other suitable methods.

To access and view content through a network such as the web, the user activates the network access software or browser located on the user's client device. The browser requests and downloads the requested content which is typically linked to a web page. As indicated above, the browser requires software to view requested content. This software is called a viewer or player. Viewer software may be part of the browser, or what is commonly called a plug-in. The viewer may also be unique software and not a plug-in to the browser. If the viewer is unique software, it may run even if the browser is closed. The viewer supplements the browser's ability to display media or other content to a user. The viewer is separate software that must often be purchased, and which permanently occupies computer memory and other resources. It should be appreciated that media and other content may be viewed using many different networks.

Clients such as cellular telephones, pagers, PDAs, communicators, set-tops, watches, and computers generally have different hardware including different CPUs or processors, use or have different operating systems for such hardware, and use or have different browsers or other network access software. For example, different computer clients may have different operating system environments such as LINUX®, UNIX®, WINDOWS 95®, WINDOWS 98®, WINDOWS 2000®, WINDOWS ME®, MACINTOSH®, and VXWORKS®. Another example is that different computer clients may include different browsers such as INTERNET EXPLORER® and NETSCAPE®, and PDAs may be provided with browser software such as ProxiWeb so the PDA can be used to access a network.

Accordingly, one problem with the delivery and viewing of media or other content over networks is that because different client devices have different hardware, use different operating systems, and use different browsers, there is a need for numerous different content viewers, each specifically designed to operate on the client for the client's particular hardware, operating system, and browser as well as different versions thereof. A user may, therefore, be required to purchase or download several viewers for the user's different client devices. For example, a user may have more than one computer. One of the user's computers may use a MACINTOSH® operating system with a NETSCAPE® browser, and the other may use WINDOWS 98® with INTERNET EXPLORER®. The same user may also own a cell phone and a PDA. The user must purchase or download different viewers for each of those devices. When the viewer software is upgraded, the user must also purchase or download the upgrades for each of these devices. Thus, a multitude of different viewers are currently needed for different client devices. It should also be appreciated that each different viewer permanently occupies memory on the respective client device. This may decrease the efficiency of the client device and the ability of the client device to perform other functions.

Another problem with media and other content delivery and viewing over networks is that once the content is placed on a network it may be freely downloaded, copied, or redistributed. Controlling access, and preventing copying of such content after it is released to the content provider is extremely difficult. For that reason, providers of proprietary content such as music and movies are inhibited from distributing content for public access on a network without an ability to restrict access to authorized users. Authorized users can include those who meet certain requirements such as age, or those who have paid a license fee to view the protected content.

Accordingly, a need exists for a media or other content delivery and viewing system and method that reduces or eliminates requirements for multiple viewers for different client devices. A need also exists for a media or other content delivery and viewing system and method that is transparent to users, and that does not permanently occupy client device memory and resources, or require periodic upgrades. A further need exists for a system and method that enables a content provider to securely distribute media or other content files.

Further, configuring a network-enabled device, such as a personal computer on a data network, a personal digital assistant (PDA) on a network, a cell phone, and the like, to receive multimedia bit-streams for the purpose of presenting full motion video and audio has historically required a complex series of tasks, including manually installing software to the device and updating the software manually when the device is no longer capable of processing the streams because of enhancements or changes in the characteristics of the streams. And while information Technology (IT) professionals have become adept at this process, this requires a costly overhead in an enterprise to maintain a staff sufficient to perform the manual steps and maintenance on each device. In many cases, full-time support professionals are required to process the manual steps for the general user community for which they are responsible. In some cases, this is cost-prohibitive. Alternatively, many environments have avoided incorporating A/V services on their networks because of the complexity and high maintenance costs associated with the process of manual installation of client applications.

SUMMARY OF THE INVENTION

One embodiment of the present invention enables one or more users to receive and consume media or other content from a network using any one of a wide range of clients or client devices, including but not limited to, desktop or laptop computers, personal digital assistants, cellular telephones, communicators, interactive television set-top boxes, digital watches, pagers and any other suitable device capable of accessing and displaying content such as natural media content. These devices are referred to herein as clients, client devices or network access devices. The system and method of the present invention eliminate the need to purchase, download and install multiple viewers, and permanently store them on the client devices, and to constantly purchase and install viewer upgrades. The content delivery and viewing system and method of the present invention also enables content providers to securely distribute content files. It should also be appreciated that while the present invention is primarily described below regarding a user viewing content such as audio-video through a client device, it should be appreciated that the present invention enables a user to simultaneously view a plurality of different content through the same client device.

In general, the method of delivering and viewing content of the present invention includes a web server or a web portal receiving a request from a client device to access content, determining the client device environment, preferably including the client hardware and software, selecting a content viewer compatible with the client environment specifically including the client's determined hardware and software, and downloading the selected appropriate content viewer to the client. One preferred embodiment of the system of the present invention includes a client environment finder for determining the client's environment, a viewer selector for selecting a content viewer compatible with the user's client environment, and a viewer downloader for downloading the selected content viewer to the client. In one preferred embodiment, a Java program called an applet performs these functions. It should be appreciated that more than one programs can alternatively perform these functions. The applet is streamed to the client when the client device requests content, and runs in conjunction with the client's browser. The downloaded applet determines the user's client environment, selects the appropriate content viewer compatible with the user's client environment from a plurality of possible content viewers, and delivers the selected content viewer to the client. In an alternative embodiment, the determination of the user's client environment and the selection of the appropriate content viewer are performed by a web server or web portal in conjunction with the applet.

In one preferred embodiment, the applet streams the selected viewer to the client device, and instructs the device to execute the viewer. Upon completion of the viewer, the applet deletes the viewer from the client device, cleans any allocated client device resources used by the viewer, thus making the viewer transparent to the user. In another aspect of the present invention, user authentication is required before the streaming of the viewer and/or consumption of the media. In a further aspect of the present invention, the content is encrypted so only one user or client device may view the specific delivered media or other content. Because the viewer is also deleted from the client device after termination, a content provider can more securely distribute media and other content.

According to some embodiments of the present invention, methods and systems are provided for provisioning a network-connected device with a platform-specific native mode client application to access information, thus reducing or eliminating the need for specialized manual installation and specialized IT support personnel.

According to some embodiments of the present invention, user devices are automatically provisioned with viewer applications designed for viewing multimedia network services within a device environment.

According to some embodiments of the present invention, a media server system is adapted to respond to a media request by providing an agent to a requesting device, with the agent adapted to detect a runtime environment on the requesting device and to acquire an application adapted to execute in the runtime environment of the requesting device.

Additional features and advantages of the present invention are described in, and will be apparent from, the following Detailed Description of the Invention and the figures.

BRIEF DESCRIPTION OF THE DRAWINGS

FIG. 2A is a table identifying examples of different network access devices, different types of hardware, different types of operating systems, different types of browsers, and different viewers compatible with each of the different combinations for IBM-based desktop or laptop computers.

FIG. 2B is a table identifying examples of different network access devices, different types of hardware, different types of operating systems, different types of browsers, and different viewers compatible with each of the different combinations for Mac-based desktop or laptop computers.

DETAILED DESCRIPTION OF THE INVENTION

Figure 1:
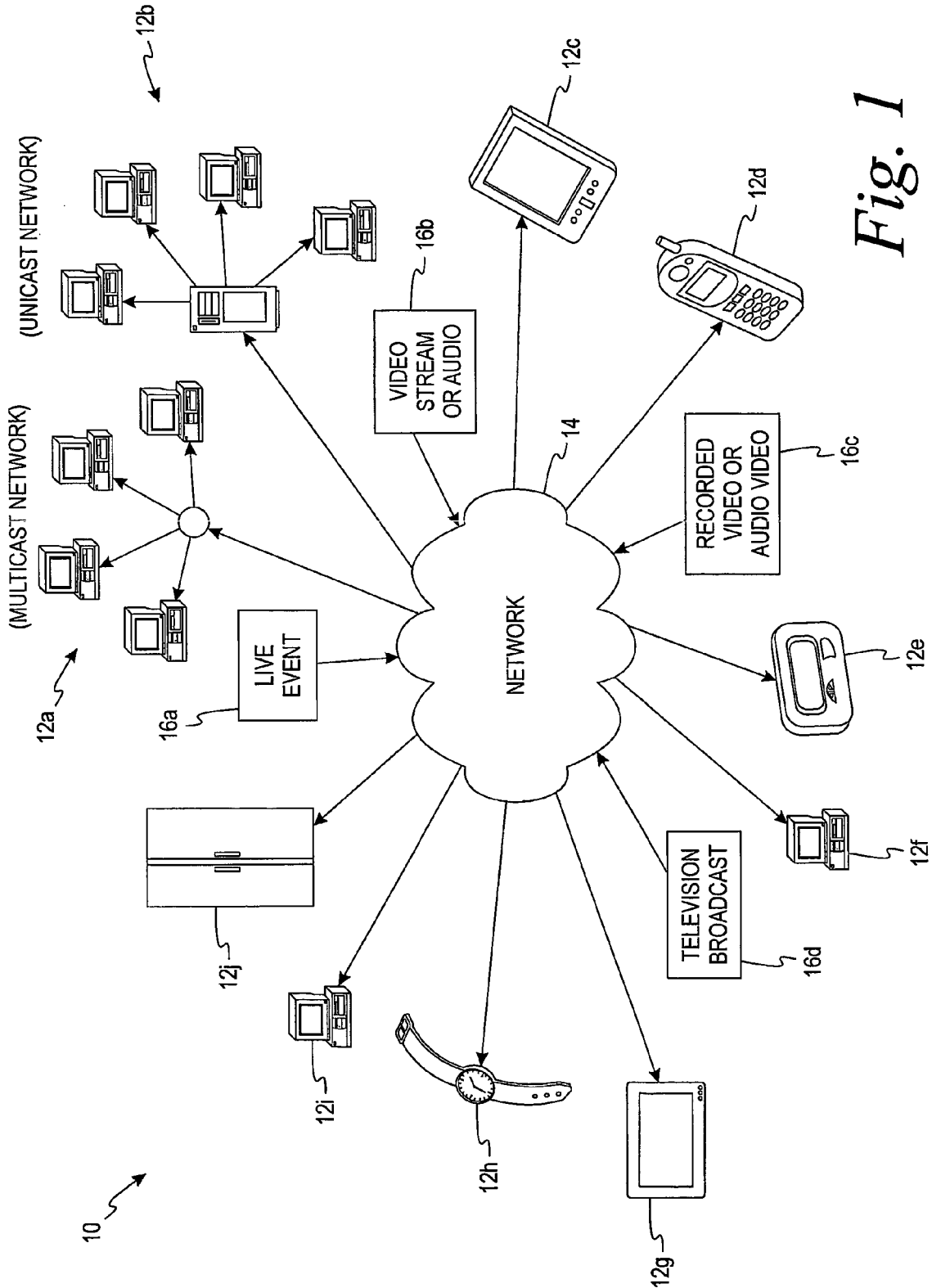
FIG. 1 is a schematic diagram depicting one embodiment of the system and method of the present invention for streaming and playing media or other content to a plurality of different client devices over a network which receives content from a plurality of sources.
Figure 1B:
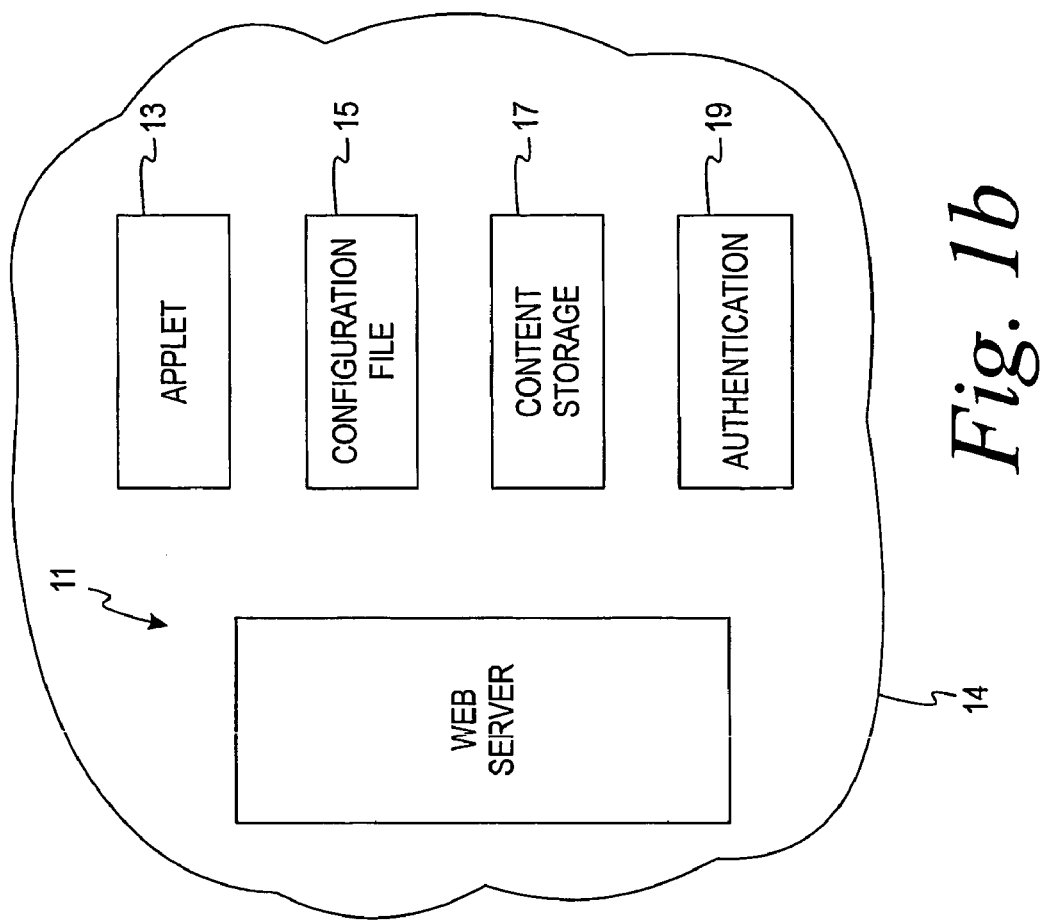
FIG. 1B is an enlarged view of another embodiment of the web server on the network which is accessed by the client device.
Figure 1A:
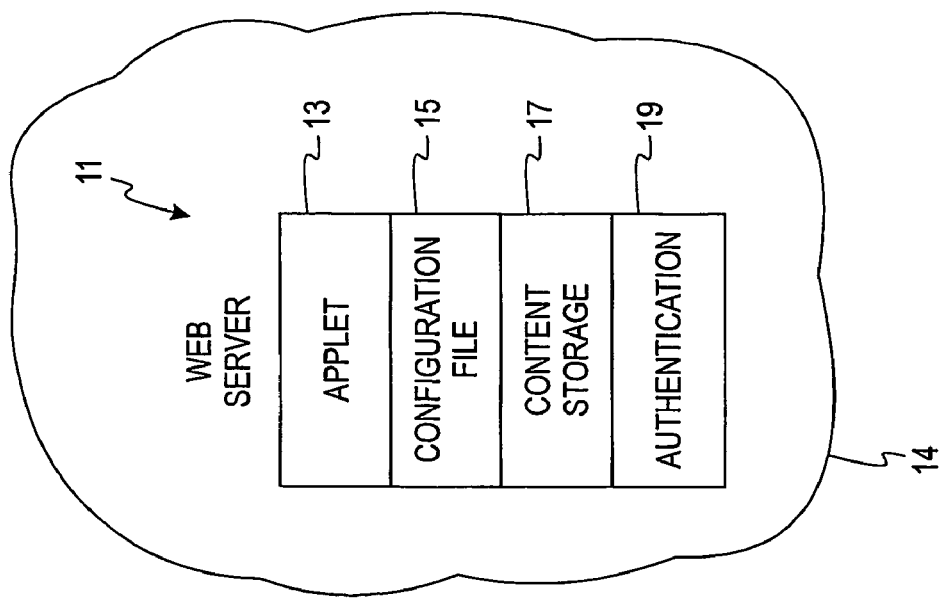
FIG. 1A is an enlarged view of one embodiment of the web server on the network which is accessed by the client device.

Referring now to the figures, FIGS. 1, 1A, and 1B generally illustrate the different content and different clients employed in one embodiment of the present invention. The present invention relates to applications or client devices that may be used with a communications system 10 that enables a plurality of client devices such as client devices 12a to 12j having access to a network 14 to receive and view content files such as content files 16a to 16d through the network 14. The network 14 can comprise any suitable digital data network, including, but not limited to, a unicast network, an IP multicast-enabled network, the Web, or a corporate LAN or intranet.

Client Devices

More specifically, FIG. 1 shows examples of client devices including computers in an IP multicast-enabled network 12a (see also FIG. 7), computers in a unicast network 12b (see also FIG. 8), personal digital assistants (PDAs) 12c, cellular telephones 12d, pagers 12e, set-top boxes 12f used in connection with interactive television, televisions such as high definition television (HDTV) 12g, digital watches 12h, individual desktop or laptop computers 12i, and networked appliances 12j.

Each of these client devices 12a to 12j may include different hardware, operate using different operating systems and have different network access program or browsers for accessing files from the network 14. For instance, these client devices may use operating systems such as Linux®, Unix®, Macintosh®, VxWorks®, and Windows® 95, 98, 2000, NT, and Me, and browsers such as Internet Explorer® and Netscape®. The PDAs, telephones, and other client devices 12 will have substantially different operating systems and use different browsers to access the network.

FIGS. 2A and 2B identify examples of different client devices and their associated hardware, operating systems and browsers. As FIGS. 2A and 2B illustrate, the different client devices may each include several different hardware and software including operating systems and network access programs or browsers. Each different combination may require a different viewer which is selected by and provided to the client device by the system of the present invention based on the determination of such specific client environment by the system of the present invention. FIGS. 2A and 2B illustrate combinations for IBM and Mac-based desktop or laptop computers, respectively. Additional client devices require additional combinations of hardware, software, operating systems and network access programs. Moreover, new client devices having new or different hardware and using new operating systems and network access programs are constantly being developed. Such devices may be added to the system of the present invention as they are developed. The system of the present invention enables all of these client devices 12a to 12j and new client devices (collectively referred to herein as client devices 12) with their multiple environments to access the network 14 to receive and view digital media and other content without the need for content-specific viewer software to be stored on each client device 12. FIGS. 2A and 2B thus illustrate that the system of the present invention provides different viewers for each of these different devices and different viewers for devices with different environments or different types of hardware and software.

FIG. 1A illustrates one embodiment of the web server 11 on the network 14 which is accessed by the client devices 12. An applet 13 resides on, is stored in, or is stored in a memory device or medium accessible by the web server 11. The web server 11 also includes a configuration file 15 which interacts with the applet 13, content storage 17 for storing content 16a to 16d, and authentication information 19 for authenticating a user's right to access the content 16a to 16d. FIG. 1B illustrates an alternative embodiment of the server 11 on the network 14 which is accessed by the client devices 12 of FIG. 1. FIG. 1B illustrates that the applet 13, configuration file 15, content storage 17, and the authentication information 19 may be on servers separate from the web server 11, but that communicate with web server 11 through the network 14.

Content Files

FIG. 1 also broadly illustrates examples of different types of media or other content that content providers supply to the network 14 and that may be viewed by the client devices 12. These include, but are not limited to, live events 16a, video or audio streams 16b, recorded video or audio video files 16c, and television broadcasts 16d. Content may be provided to the network in a variety of ways, and may include other types of data. For example, recorded audio-video may be in discrete files that are streamed to a client device 12. Discrete files can be completely downloaded before they are viewed by a user through the client device 12 and streaming audio video may be viewed while it is being broadcast to the client device 12.

Figure 3:
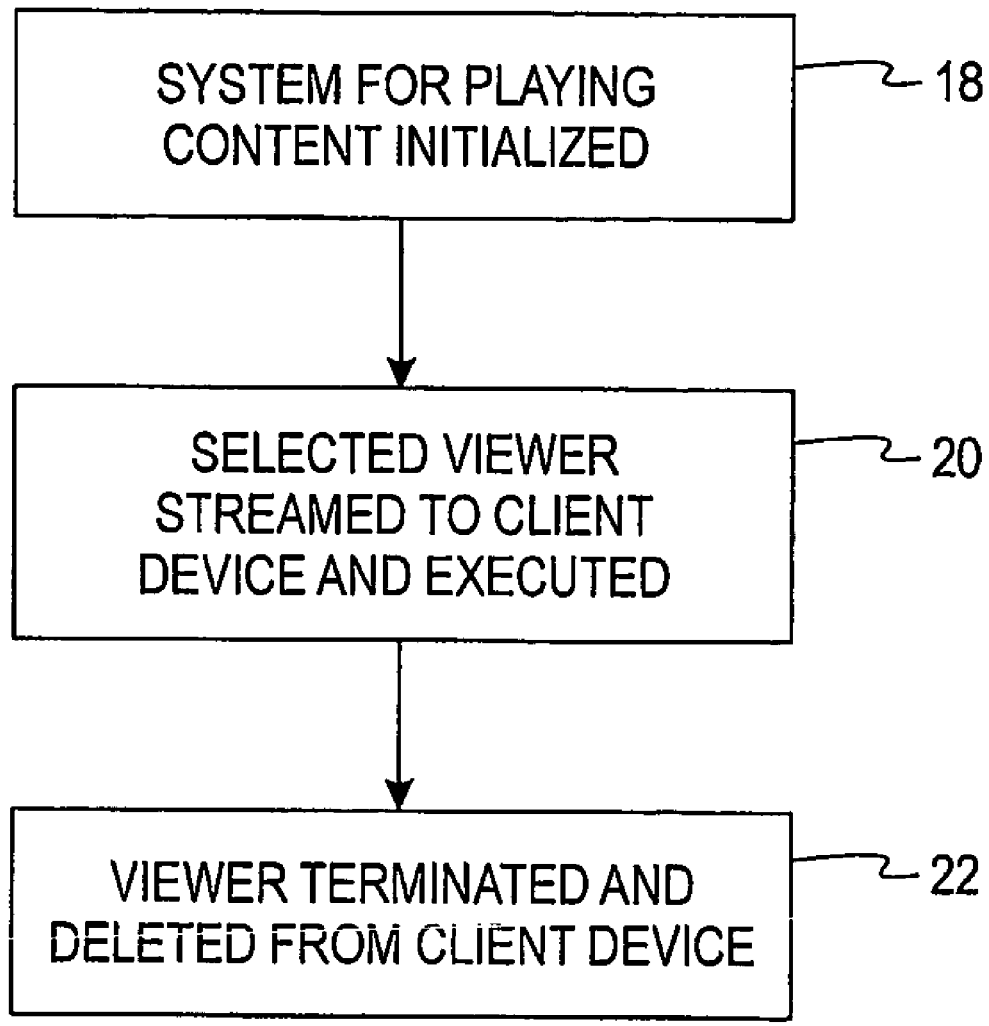
FIG. 3 is a high level flow diagram of one embodiment of the method of the present invention.

The basic functions of the system and method of one embodiment of the present invention are illustrated in the high-level flow chart of FIG. 3. FIG. 3 discloses the three stages of the content delivery and viewing method and system of the present invention which includes the initialization stage or process 18, the execution stage or process 20, and the termination and deletion stage or process 22.

Initialization Stage

Figure 4:
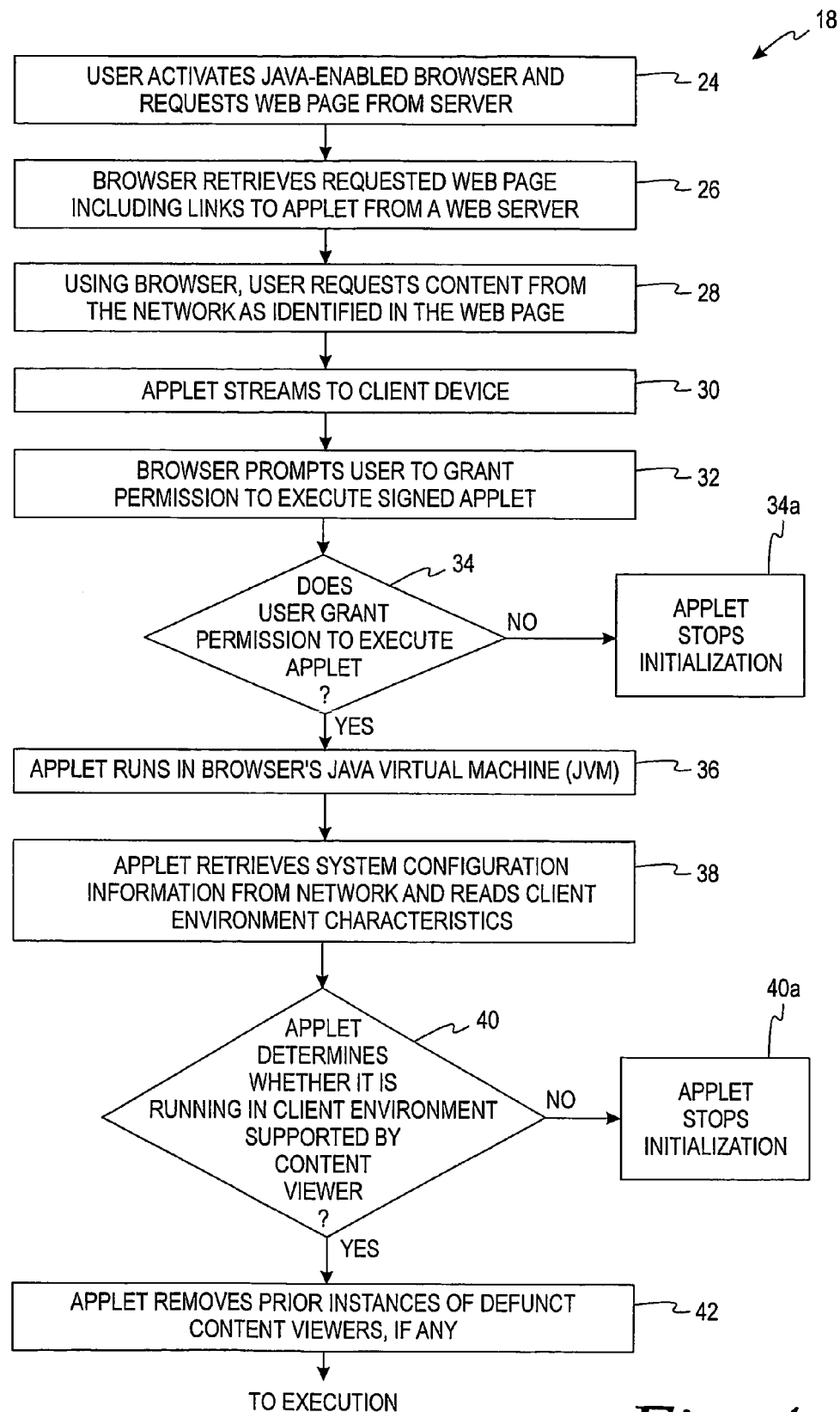
FIG. 4 is a flow diagram depicting the initialization process of one embodiment of the method of the present invention.
Figure 10:
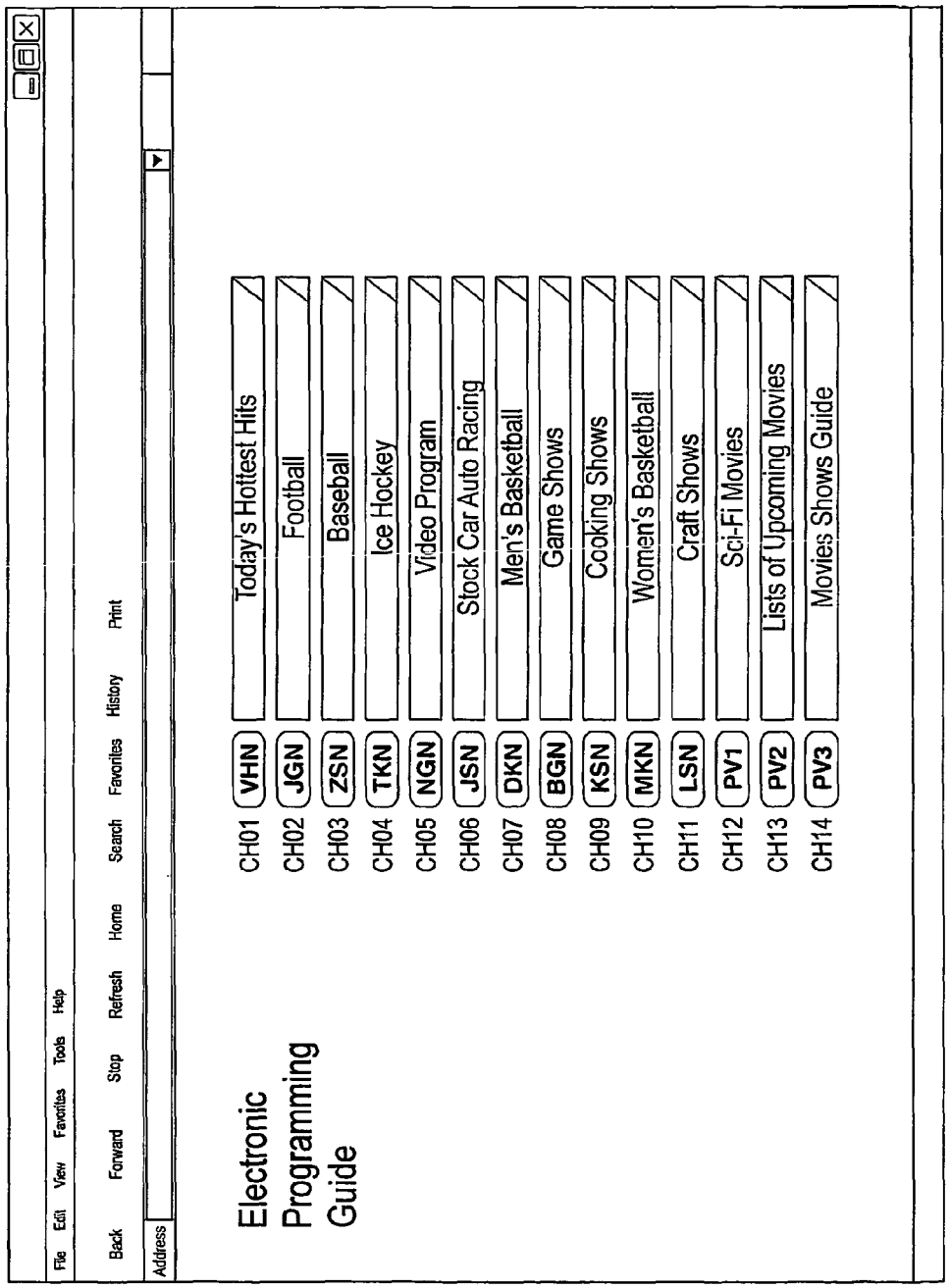
FIG. 10 is an illustration of a web page with links to a plurality of media or content choices or channels.

In one embodiment of the present invention, the initialization stage or process 18 initializes the client device. FIG. 4 illustrates one preferred initialization process 18 of the present invention. The initialization process begins when the user activates a java-enabled browser located on the user's client device 12 as shown in block 24. Example browsers associated with particular client devices are listed in FIG. 2. In this embodiment using the browser, the user requests a page such as a web page from a server 11 such as a web server on the network 14 as also shown in block 24. The server may be a web server for hosting web pages on the World Wide Web. The server can alternatively for example be a corporate intranet server hosting the corporation's intranet web page or some other private network. In such a case, a viewer guide is preferably provided to users on the corporate intranet web page, or as a link on the corporate intranet web page. Such a web page contains links to available media or other content. FIG. 10 shows an example of such a web page with a plurality of media or content choices or channels.

Based on the user's request, the browser retrieves the requested web page from a web server 11 on the network 14 as illustrated by block 26. The web page, which includes links to an applet 13 of one embodiment of the present invention, is loaded into the browser on the client device 12. Using the browser, the user requests the desired content from the network 14 by clicking on the web page link to the content as illustrated by block 28. After clicking the link, the web server serves the applet 13 (which in one embodiment is written in the Java language) to attempt to stream to the user's browser as shown in block 30. Java permits software applications to be run from a web page. As an application, an applet, once executed, can do irreparable damage to a user's computer or other client device should someone insert a virus or other malevolent program in the applet 13. Therefore, the applet is signed with a unique digital authentication certificate to allow the browser to determine whether the party from whom the applet 13 will be loaded is a "trusted party." Trusted party certification is done using well-known procedures, including, but not limited to, the program(s) provided by VeriSign™. The browser must verify the applet's trusted status before accepting the applet 13 to be executed. The browser prompts the user to grant permission to execute the signed applet 13 as shown in block 32.

The browser is directed to grant or reject providing the applet execution rights as illustrated in decision block 34. If the applet 13 is not accepted because it is not from a trusted party, the applet stops the initialization as illustrated by block 34a. If the applet 13 is granted the right to execute, in one embodiment, the applet 13 executes in the browser's Java Virtual Machine (commonly called JVM) as illustrated in block 36. Once the applet 13 executes, the applet 13 retrieves the system configuration file 15 from the network 14 and reads the client environment characteristics of the client device 12 on which it executes as shown in block 38. The applet 13 includes a program or client environment finder. The system configuration file 15 (shown in FIGS. 1a and 1b) contains content viewer compatibility information. In one embodiment, the configuration file 15 contains information regarding the transport mechanism applied to retrieve the viewer software depending on the protocol, hypertext transfer protocol (commonly called HTTP), a secure HTTP (commonly called HTTPS), or file transfer protocol (commonly called FTP), the server name or IP address where the viewer software resides, port number, and user identification or password, if required. In one embodiment, the configuration file 15 also contains mappings for available viewers defining the content viewer software file name and path depending on the supported platform (such as Windows 95, Windows 98, MacIntosh, Linux, etc.).

It should be appreciated that in an alternative embodiment of the present invention, the configuration file 15 need not be downloaded to the user's browser. The configuration file 15 may remain on the server 11 as shown in FIG. 1a, or may be located on another host server as illustrated in FIG. 1b. This may occur because the configuration file 15 may be large, and therefore, difficult or time-consuming to download to the client device. Additionally, the system implementor may not want to download the configuration file 15 to the client device 12 for security or secrecy reasons. Additionally, a large configuration file 15 may take up a correspondingly large amount of storage space on the client device 12. In this embodiment, only the necessary information from the configuration file would be employed or accessed from the server 11.

The client environment finder determines client environment characteristics which can include the client's operating software, client hardware specifications such as central processing unit type and related memory capacity, client browser information, as well as other client hardware and software information.

The applet 13 determines whether it is running in a client environment supported by the content viewer as illustrated in decision block 40. If so, the applet 13 checks for and removes prior instances of defimct content viewers, if any, as shown in block 42. If not, execution stops as shown in block 40a and a suitable message is provided to the user.

Execution Stage

Figure 5:
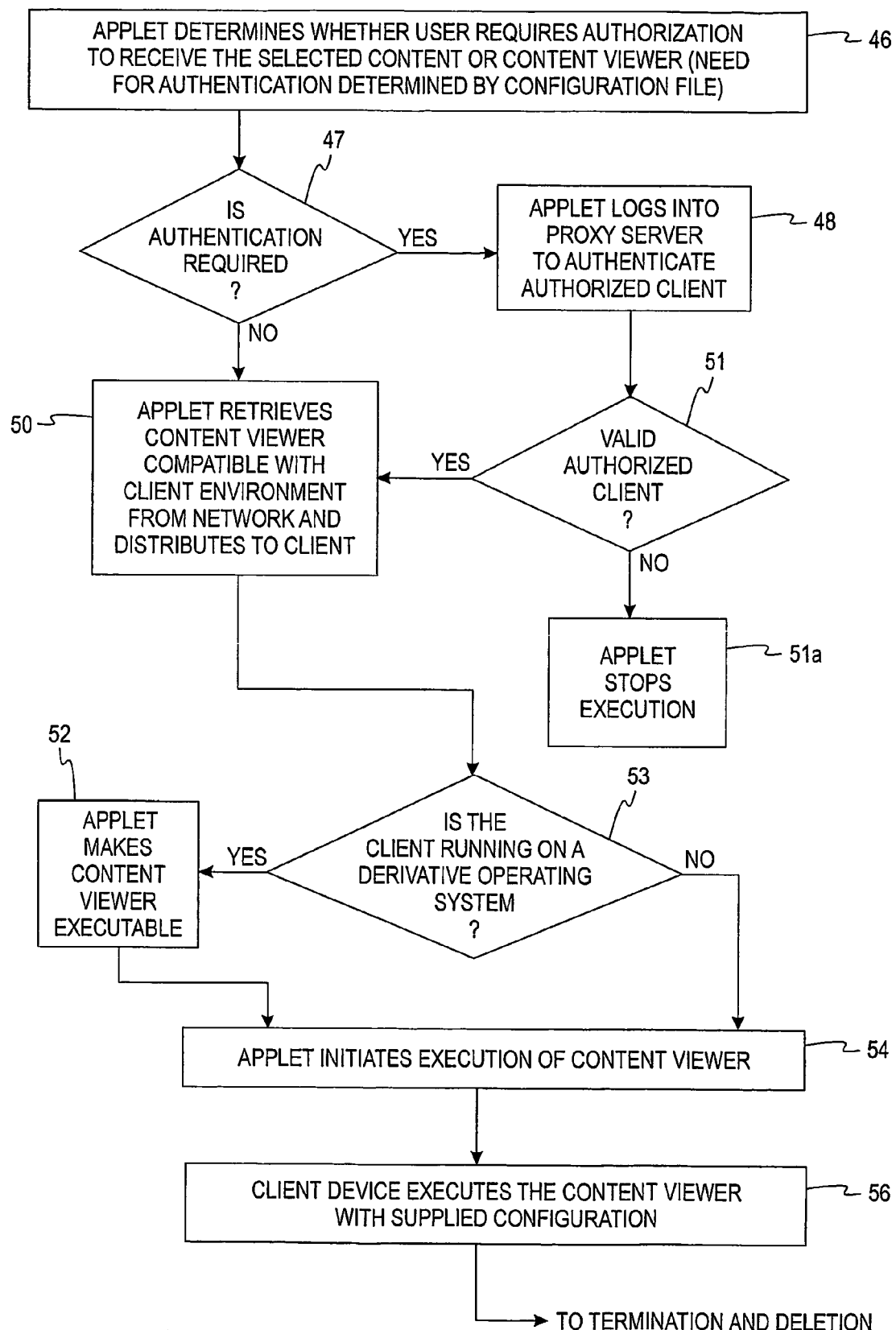
FIG. 5 is a flow diagram depicting the execution process of one embodiment of the method of the present invention.

After the initialization stage 18 concludes, the execution stage 20 begins. The execution stage 20 is generally illustrated in FIG. 5. Specifically, the applet determines whether the user requires authorization to receive the selected content or viewer as illustrated in block 46. Whether user authentication or authorization is required is preferably determined by the configuration file 15. For instance, payment may be required, or access restricted to certain persons or users. If authorization or authentication is required, as shown at decision block 47, the applet 13 logs onto an appropriate proxy server to access authentication or authorization information 19 as shown in FIG. 1B, and authenticates the client's right to use the viewer as indicated by in block 48. It is then determined whether a valid authorized client is being accessed, at decision block 51. If the client is determined to be invalid or unauthorized, the applet stops execution as shown by block 51a. Authentication or authorization may be performed using any suitable standard sequence. In this way, content providers can ensure secure distribution of their media and other content delivered to the client devices using the system of the present invention. If authentication/authorization is successful or not required, the applet 13 retrieves the content viewer compatible with the determined client environment of the client device 12 from the network 14 as generally illustrated in FIGS. 2A and 2B, which show examples of platforms. It should be appreciated that different viewers may be necessary for each different client device, each different hardware configuration of each client device, each different operating system (and other software) of each client device, each different browser on each client device, and for different permutations of same as generally illustrated in FIGS. 2A and 2B. One substantial advantage to the present invention is that multiple users accessing one or more different networks to obtain media and other content using one or more different client devices can access that data using the appropriate viewers provided by the system of this present invention. The applet distributes the selected content viewer to the client device 12 from the appropriate server as illustrated by block 50. The server 11 can be the same server containing the web page, a warehouse server hosting viewer files, or any other client accessible storage device or medium.

In one embodiment, the available content viewers are contained as discrete files on a server 11 such as a web server. Each viewer version is a separate file located on the server. After a viewer application file is selected for candidacy as compatible with the particular client environment, the file as a whole is forwarded to the client device from the server as indicated by in block 50. Alternatively, because the content viewers may contain similar blocks of code, they may be compiled at the server from a plurality of co-acting code modules, and then delivered to the client device. Having discrete viewers requires greater storage space on the server and has an advantage of greater speed in the selection and delivery of the viewer. Compiled viewers have the advantage of taking less storage space on the server. However, such viewers must be compiled from modules and thus take more time to assemble and deliver.

After the content viewer is completely delivered to the client device, for UNIX derivative platforms only, as shown at decision block 53, the viewer application file mode is set to executable as illustrated in block 52. For all supported platforms, the applet 13 then initiates execution of the content viewer with the supplied configuration as illustrated in block 54. The digital content is then executed by the client device 12 as described below according to the supplied configuration information as shown in block 56.

When the content viewer, based on its configuration, requests content through the network, the content is sent in packets across the network via a suitable protocol such as the UDP/IP protocol. UDP, which is the User Datagram Protocol, is preferably used because it results in low protocol overhead, best effort, content transmission. In streaming video, audio, or audio-video, the packets are sent to a memory buffer in the client device. When the buffer fills to an acceptable level, the viewer starts presentation so the user can watch the video and/or listen to the audio. Live events, including television broadcasts, may also be compressed and broadcast through a network.

Multicast Network

Figure 7:
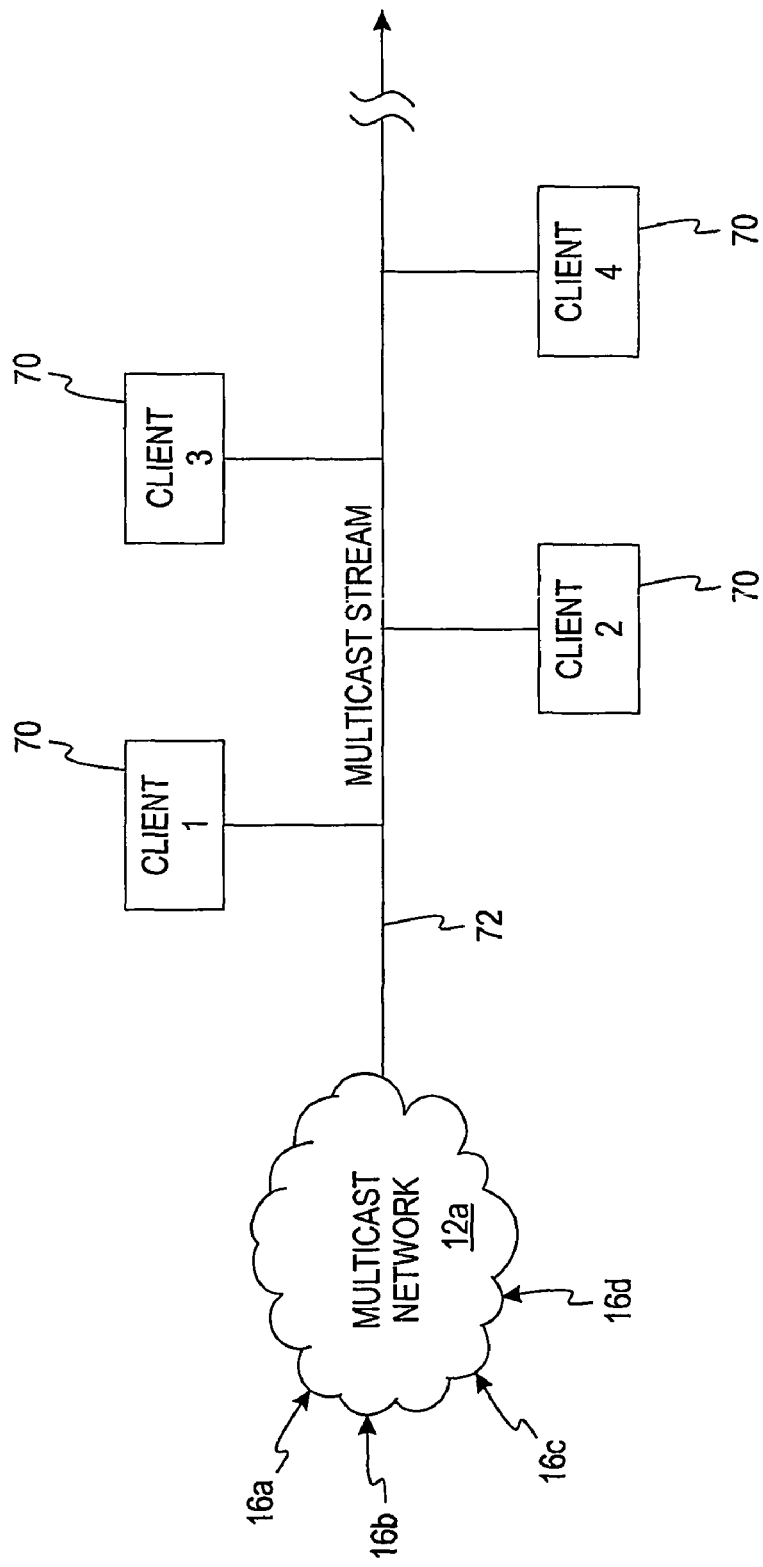
FIG. 7 is a schematic diagram depicting a multicast broadcast client and network arrangement.

In one embodiment of the present invention, content may be delivered through a multicast network such as multicast network 12a. An IP multicast-enabled network as illustrated in FIG. 7 is an addressing scheme which permits transmission or broadcast of a multimedia packet stream. In such a network, each client has a separate IP address, given as sets of numbers separated by periods such as 224-239.123.45.6. Multicast networks connect to what is called the multicast backbone, or Mbone. The Mbone is a high capacity backbone for broadcasting use IP multicast protocol. The Mbone permits a broadcast to begin as a single transmission. In an IP multicast network, a single stream 72 may reach many clients 70 simultaneously. Moreover, in an IP multicast broadcast, a 500 kilobits per second (kbps) stream requires only 500 kbps of bandwidth regardless of the number of users viewing the stream. It should be appreciated that although the client devices may have different client hardware and software environments as described above, each different client device receives the appropriate viewer such that all of the client devices are able to access the same stream. This enables different users having different client devices to simultaneously access content such as a broadcast of an executive's speech over a data network such as an intranet accessed directly or remotely at any location with any hardwire or wireless access device which communicates or is adapted to communicated with such network.

As illustrated in FIG. 7, multicast content 16a to 16d in a suitable form is streamed along the multicast network 12a and accessible to clients 70 linked to the network 12a. For example, audio-video content is typically encoded into a format such as MPEG-2, encapsulated using User Data Protocol (commonly called UDP), and multicasted via Internet Protocol (commonly called IP) for delivery through the IP-based multicast enabled network 12a to clients 70. The stream 72 contains IP addressing information for the clients 70 wishing to see the content.

Unicast Network

In another embodiment of the present invention, the content may be downloaded from a unicast network such as unicast network 12b. Certain older networks have equipment which may not be capable with a multicast broadcast. In some cases, network firewalls or router/switch protocols prevent multicast traffic. To enable such old equipment or firewalled networks to receive multicast streams, a unicast redistributor converts multicast broadcasts to unicast. A unicast stream is a one-to-one communication session between each client and the server. If one hundred clients for example are viewing a 1 megabits per second (Mbps) stream, 100 Mbps of bandwidth is required.

Figure 8:
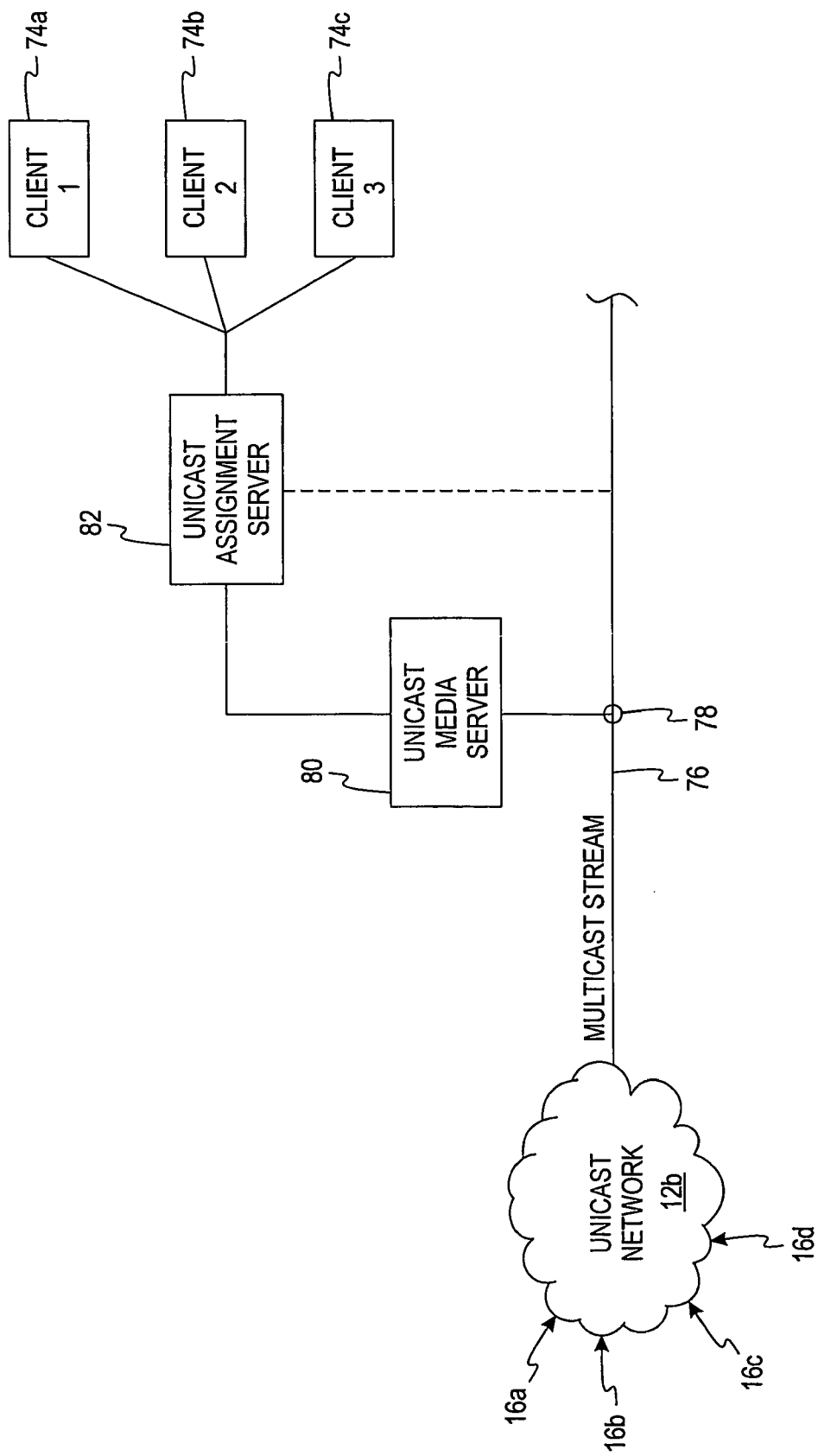
FIG. 8 is a schematic diagram depicting a unicast broadcast client and network arrangement.

FIG. 8 illustrates content 16a to 16d provided to a unicast network 12b that streams 76 in multicast to users or clients 74a-c. To permit unicast delivery of the multicast stream 76, a router 78 routes the stream to a unicast media server 80 that converts the multicast stream 76 to unicast, and sends the converted stream to individual clients 74a-c. As assignment server 82 acts as a control center. The assignment server 82 receives requests from clients 94 on the unicast network 12b to view content on the multicast stream 76, and directs them to an available unicast media server 80. There may be multiple media servers 80 and assignment servers 82 depending on the number of unicast clients 74a-c. In a unicast arrangement, the client device is receiving a copy of the multicast session.

Unicast On Demand

In a further embodiment of the present invention, the content may be downloaded from a unicast on demand network (not shown). Unicast on demand is another type of network arrangement. In a unicast on demand network, a user wishing to view a content file uses the client device to request from a server the desired content file. A server IP address is associated with the content file. The viewer reads the file from the server. In a unicast on demand arrangement, as opposed to multicast, the client device gets a private streamed copy of the content file.

World Wide Web

In another embodiment of the present invention, the content may be downloaded to from the Internet or Web (not shown). The Internet is a collection of thousands of individual networks that cooperate with each other to direct traffic to allow information to pass between them. The World Wide Web is a part of the Internet. These individual networks are run by corporations, government agencies, universities, and online services. Internet Service Providers (commonly called ISPs) also may have networks. ISPs provide individuals with Internet access.

To facilitate the necessary cooperation, the Internet, and thus the Web, operates under a number of protocols. The two most basic are Transmission Control Protocol (commonly called TCP) and Internet Protocol (commonly called IP). TCP permits computers to communicate across the Internet. IP assures that the communications reach the correct parties.

LANs are connected to the one another by bridges or gateways. Routers manage Internet traffic by ensuring that information reaches its intended destination between different networks. Gateways translate data between networks. LANs may be connected to a regional network that provide Internet access over a certain geographic area. Backbones are very high-speed, high capacity lines maintained by large corporations, or government agencies. LANs send information destined for other networks to a net access point (commonly called NAP) on the backbone where it is routed to its intended recipient.

Private Networks

In another embodiment of the present invention, the content may be streamed from a corporate intranet or other private network (not shown). Organizations, including corporations, often establish LANs, or intranets, to facilitate communication between employees, and to permit employee access to corporate and other information. Corporate intranets usually provide employees Web access. The intranet typically contains a corporate web page providing links to employee-accessible files. These files can include corporate directories, newsletters, travel information, and employee manuals. They may also include recorded video, audio, audio-video or other data files. As indicated above, live feeds of speeches, meetings, presentations, or other information can be broadcast to all or selected employees. Content includes media which is accessible on a corporate web page, making the corporation a content provider.

Termination and Deletion Stage

Figure 6:
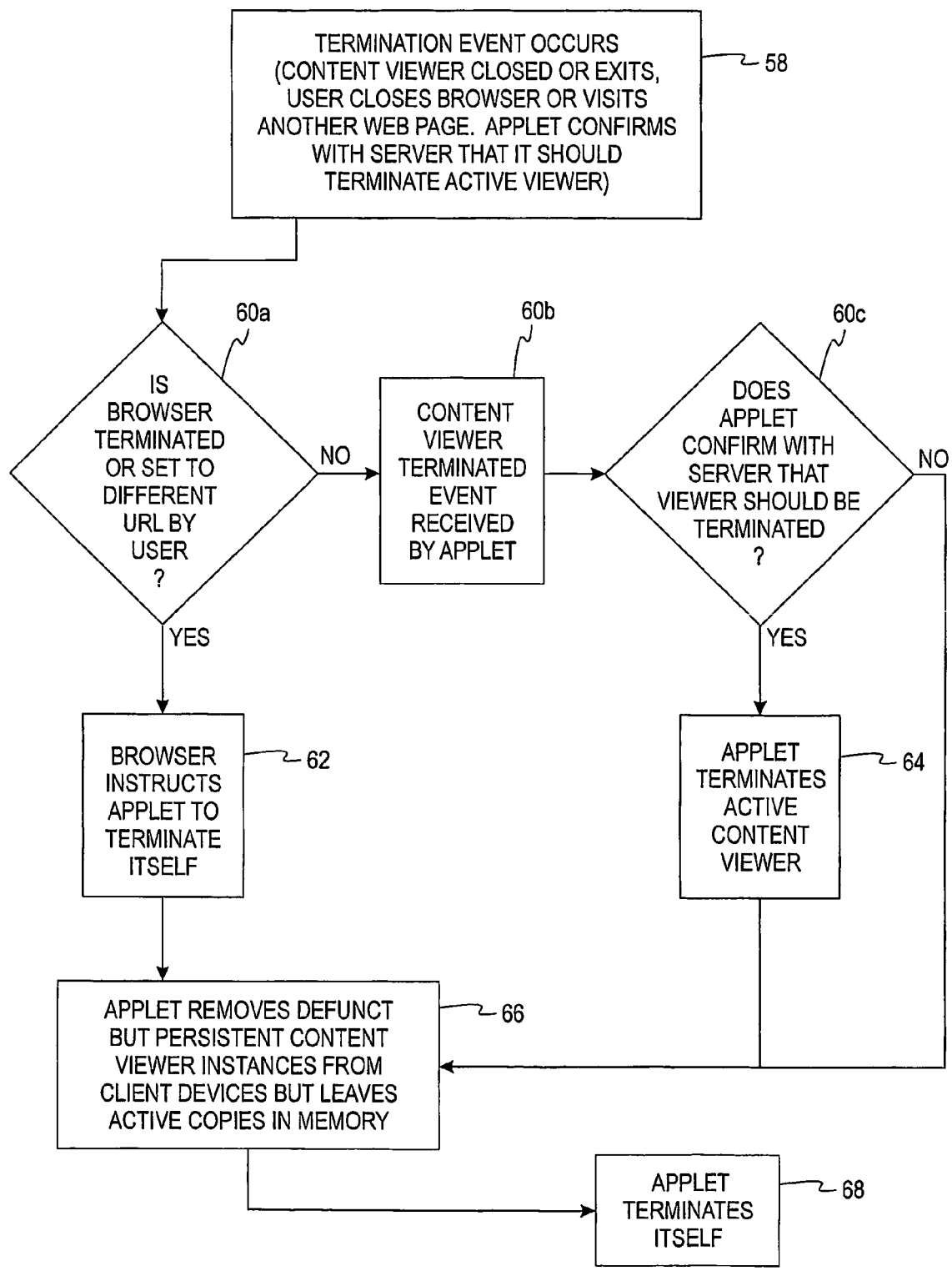
FIG. 6 is a flow diagram depicting the termination and deletion process of one embodiment of the method of the present invention.

After the execution stage 20 concludes, the termination and deletion stage or process 22 begins as illustrated in FIG. 6. A termination event occurs as illustrated in block 58 to begin the termination and deletion stage or process 22. Applet termination may be invoked by the user closing the browser on the user's client device, visiting another uniform resource locator (commonly called URL) using the client device, or by the applet 13 determining that the content viewer should be terminated via an asynchronous event as illustrated in decision blocks 60a, 60b and 60c. When the applet 13 receives termination requests from the browser as in decision block 60a, the browser instructs the applet 13 to terminate itself as shown in block 62. When the applet 13 receives a content viewer termination event as shown in decision block 60b, or confirms with the server that the viewer should be terminated as in decision block 60c, or any asynchronous event, the applet 13 terminates the active content viewer as shown in block 64. The applet 13 then removes defimct persistent viewer instances from the client device 12, and leaves active copies in memory as depicted in block 66. The applet 13 by way of the JVM also cleans up any client device resources, including disk space and random access memory (commonly called RAM), previously allocated to the content viewer. The applet 13 then terminates itself as indicated by in block 68.

Digital Rights Manager Embodiment

The system of the present invention may include a digital rights manager which permits secure distribution of digital media or other content by permitting only authorized users to access such data. Broadly stated, a digital rights manager encrypts or "locks" content so that only a user having the correct "key" can decrypt and view the content. The key is obtained in a license specific to the user or possibly to a client device.

Digital rights managers generally work as follows. A content provider packages the content by encrypting it. The encryption acts as a lock that prevents unauthorized persons from viewing the content. The encrypted packaged content is typically placed on a web server or a streaming server. The content provider typically enlists a license clearinghouse server to store the rights and rules provided by the lock. The license or "key" contains encrypted information permitting a licensed user to view the content according to the rules provided by the lock. Licenses are often granted on a user by user basis. In other words, the "keyed" content may only be accessed by the device such as a computer that has been granted a key for that file.

To consume the content, the user must acquire a license or "key" to decrypt or unlock the content. When the user tries to access the content, the digital rights manager will either obtain a pre-paid license directly from the clearinghouse server, or prompt the user that he obtain authorization to view the content. The user must also acquire a viewer that supports the digital rights manager. A digital rights manager may make each content viewer unique and link it to the web or streaming server.

Licenses may be set up in a number of ways. The license may be valid for a specific time period, such as 24 or 72 hours, for specific start and stop times, or for a specified number of plays of the content.

Figure 9:
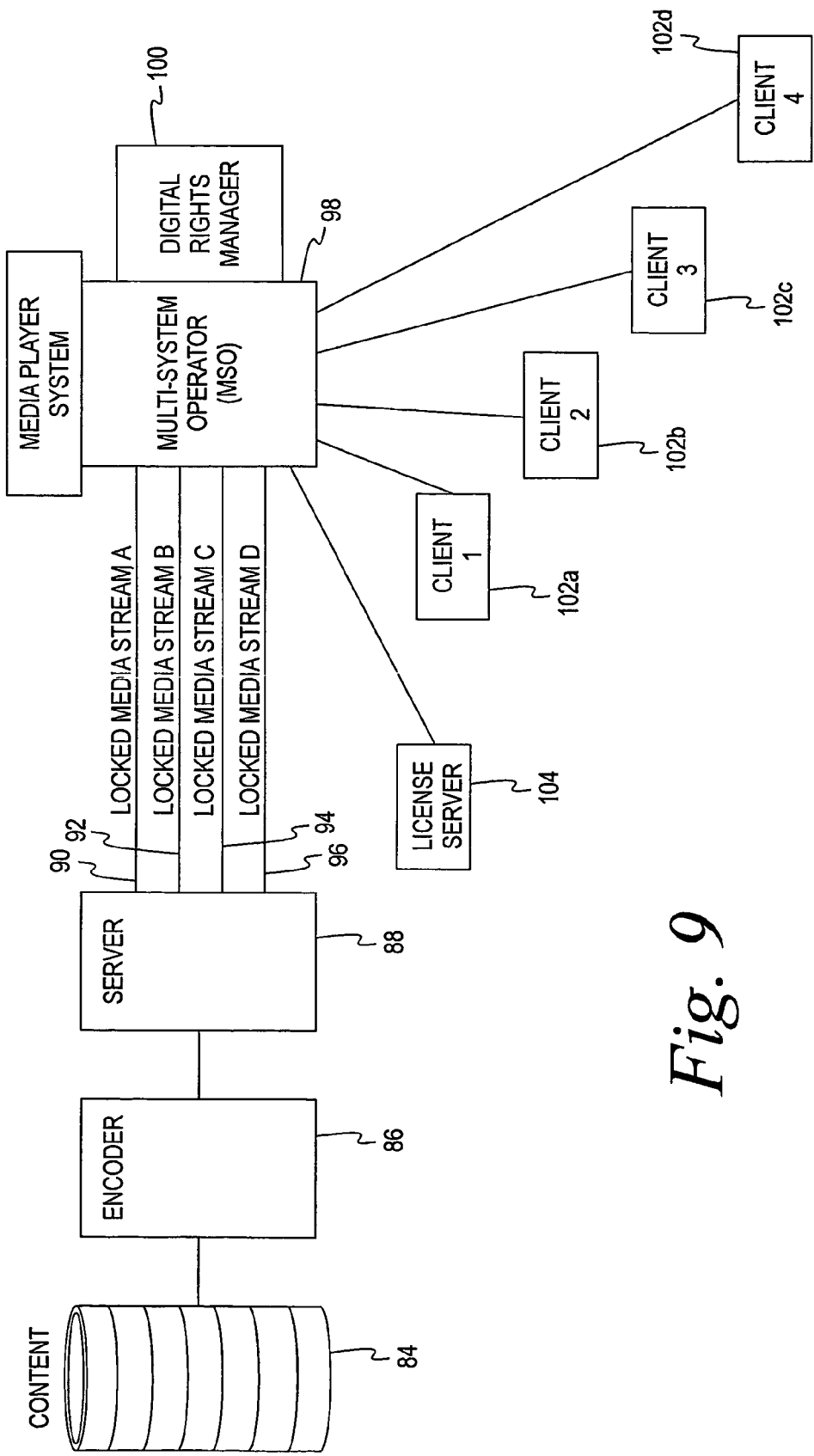
FIG. 9 is a schematic diagram for another embodiment of the content delivery and viewing system and method of the present invention.

FIG. 9 illustrates a network using the present invention in connection with a digital rights manager. Content 84 is encoded by an encoder 86 to compress the content to reduce the size of the file. The encoded file is sent to a server 88. Alternatively, the server 88 and encoder 86 may be physically located on the same piece of hardware.

The server 88 creates one or more encoded media streams 90, 92, 94 and 96 corresponding to each content media. The server 88 encrypts the content by inserting a lock onto the content. The lock is typically a specified number of bits, usually from 128 to 1024 bits, but may be any suitable number. The greater the number of bits the lock contains, the more difficult it would be for an unauthorized user to crack or determine the code. However, time limitations may require the key to be of a certain size. The larger the key the longer it takes to decrypt. Streaming video, for example, usually plays at 30 frames per second. Therefore, the key must be able to decrypt and play the stream packet in less than $\frac{1}{30}^{th}$ of a second.

The server delivers the encrypted or locked content or media streams A-D (90-96) to a multi-system operator (MSO) 98. The MSO 98 contains a digital rights manager 100. Connected to the MSO 98 are clients 102a-d. A license server 104 also is connected to the MSO 98. The license server 104 contains the licenses and stores the licenses and rights provided by the lock placed on the stream or file, and may act as a license clearinghouse.

Figure 11:
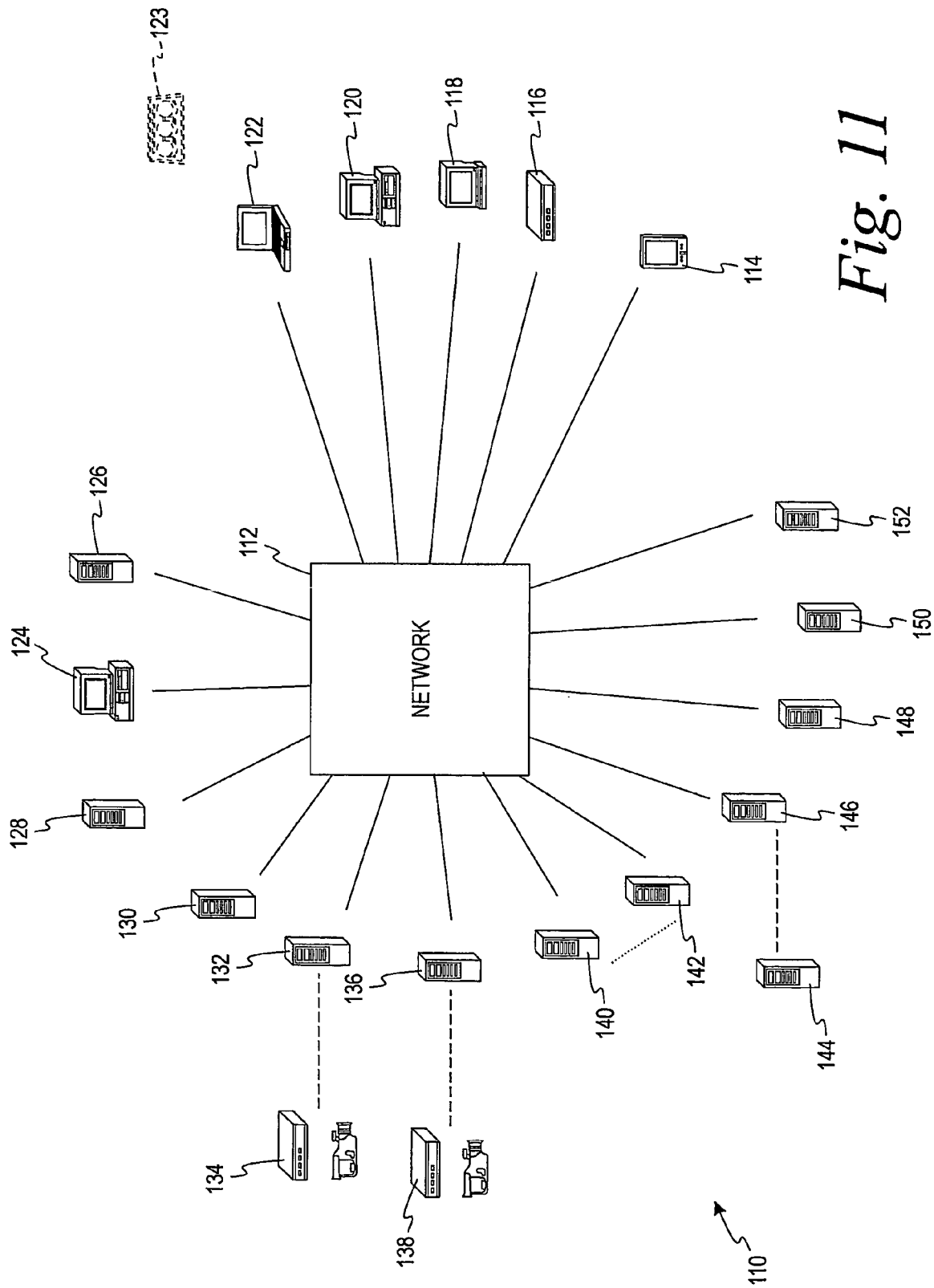
FIG. 11 is a block diagram showing a system overview according to one embodiment of the present invention.

Referring to FIG. 11, an embodiment of a media sewer system 110 and its network environment according to one embodiment of the invention is illustrated. A computer communication network 112 which is capable of carrying information streams such as Multicast User Datagram Protocol (UDP), Unicast UDP, Hypertext Transfer Protocol (HTTP), Hypertext Transfer Protocol Secure (HTTPS), Telnet, or Transmission Control Protocol (TCP) over Internet Protocol (IP) is shown. On the user side of the network 112 are various network-enabled devices 114-122 which may be used with the present invention, examples of which are a Personal Digital Assistant (PDA) 114, set-top box 116, Linux PC workstation 118, Windows PC 120 and/or an Apple Macintosh PC 122. A display 123 such as a CRT or projector may be used to display content accessed using systems and methods according to the present invention. The network-enabled devices 114-122 are meant to be illustrative and not exhaustive, and other types of devices may be used according to some embodiments of the present invention. Within the media server system 110 is an administrator 124 and a variety of servers. The servers are shown as individual functions and may be combined into a single server or combination of servers depending on the needs of the network deploying the media server system 110. The server functions shown in FIG. 11 are a licensing manager 126, a data caster/injector 128, a media sewer module 130, an encode/transcode station 132 adapted to accept video input from a video source 134, such as a camera, a set-top box, a direct cable or satellite input or the like, a live encoder 136 adapted to accept video input from a video source 138, an administrative logger 140, a client transaction broker 142, an external billing system 144 connected to a Subscriber Management System (SMS) 146, a media archive 148, a provisioning broker 150, and an encryption engine 152. While some embodiments of the present invention utilize all of the functions shown in FIG. 11, it is to be understood that some embodiments of the present invention utilize fewer than all of the shown functions, Media server systems according to the present invention may be deployed in a number of different environments. For example, deployments for businesses, universities, hospitals, and similar environments having networking capabilities are contemplated.

Alternative embodiments may combine the server functions as required by a specific implementation based on media volume and control functionality. Alternative implementations may also not deploy certain servers, for example, an embodiment which is only a library for stored media may not require the capture of live streams as for example, broadcast TV. Alternative embodiments may also deploy the server side on a separate secure network within the media server system 110 separate from the network 112 and allow access to network 112 on the part of the servers on a case by case basis.

Figure 12:
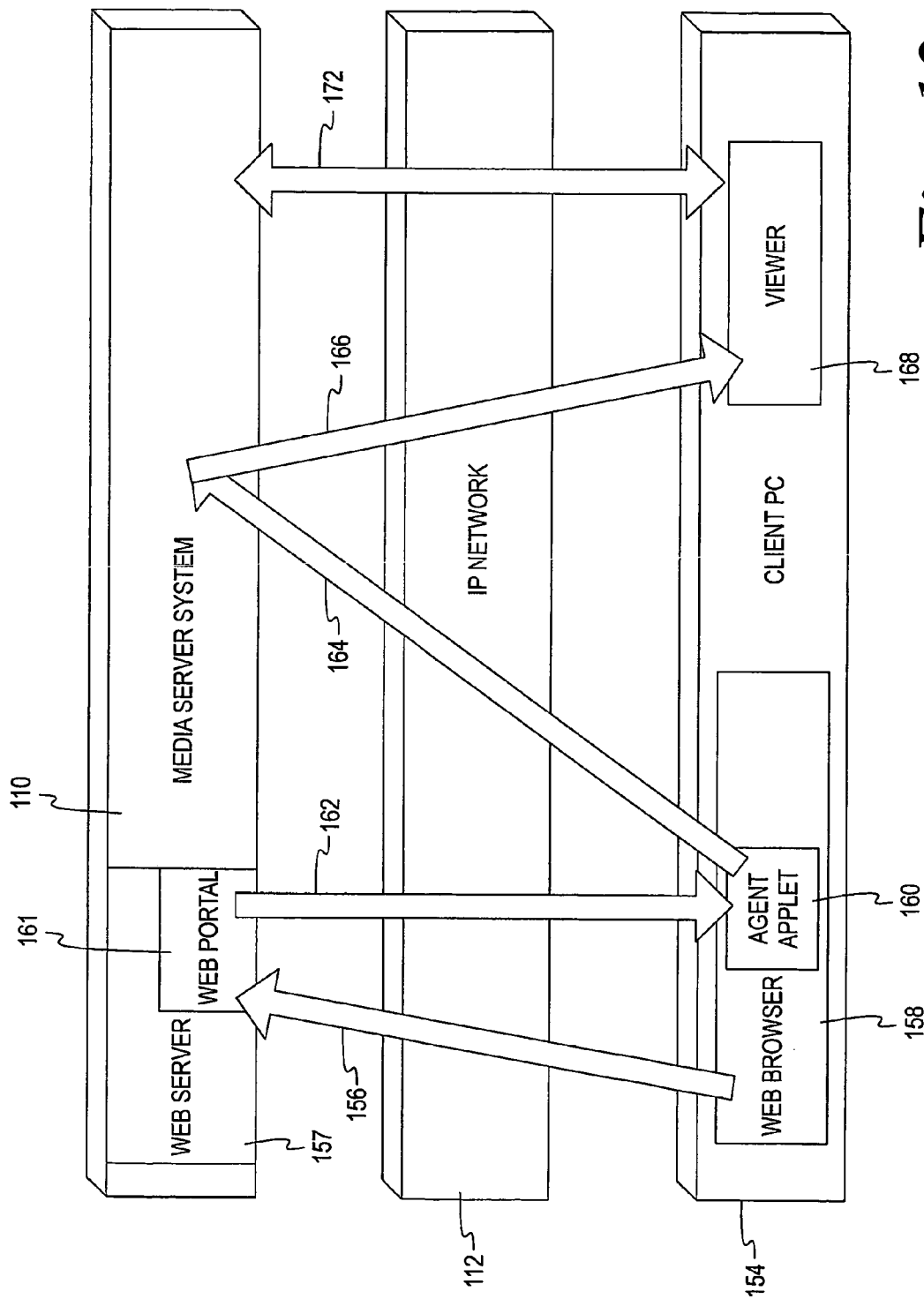
FIG. 12 is a block diagram showing information flow in a system according to one embodiment of the present invention.

Referring now to FIG. 12 a schematic diagram of the interactions between a network-enabled client device 154 and the media server system 110 according to one embodiment of the invention is shown. In the embodiment of FIG. 12, a user on the client device 154 initiates a viewing event by making an HTTP or HTTPS request (shown by arrow 156) to the URL of a media server system web server 157, using a web browser 158. The web browser 158 attempts to load a signed agent applet 160 from a media server system web portal 161 to a runtime environment on the client device 154. A runtime environment on the client device may be a runtime environment such as the JAVA™, Microsoft .NET™, or Openview runtime environments, or it may be an operating system such as MAC OS™, Linux, Microsoft's Windows™ operating system, and the like. The web browser prompts a user at the client device 154 to accept the agent applet 160 and if accepted the agent applet loads to the runtime environment on the client device 154 and begins to execute. In the embodiment shown in FIG. 12, the agent applet begins to execute in the context of the web browser 158; in other embodiments, the agent applet may execute in any runtime environment, including within an operating system (OS). If the user does not accept the signed applet, then processing is terminated and the applet is not loaded to the client device 154. Acceptance or denial of the applet may be automatic once a user of the client device 154 decides to always accept or always decline the applet.

When the signed applet is accepted by the user of the client device 154, an agent applet 160 is downloaded to the client device 154, as shown by the arrow 162, where the agent executes in the runtime environment and determines the configuration of the client device 154. The agent then requests retrieval of an appropriate device-specific content viewer 168, as shown by the arrow 164. Though the embodiment of FIG. 12 shows the viewer 168 as the downloaded application, it is to be understood that systems and methods according to the present invention may enable the provisioning of applications other than viewers adapted for execution in the device environment. For example, in response to a request for financial data, the properly executed application may be a spreadsheet optimized for the device environment. As shown by the arrow 166, the media server system 110 then downloads the selected content viewer 168 to the client device 154 and executes in its own context, outside the scope of the browser 158. The viewer 168 maintains its own connection 172 with the media server system 110. At this point, the browser 158 can be closed or set to a different URL without affecting the content viewer 168. According to the embodiment shown in FIG. 12, an IP network 112 serves as the network over which the described operations occur.

Figure 13:
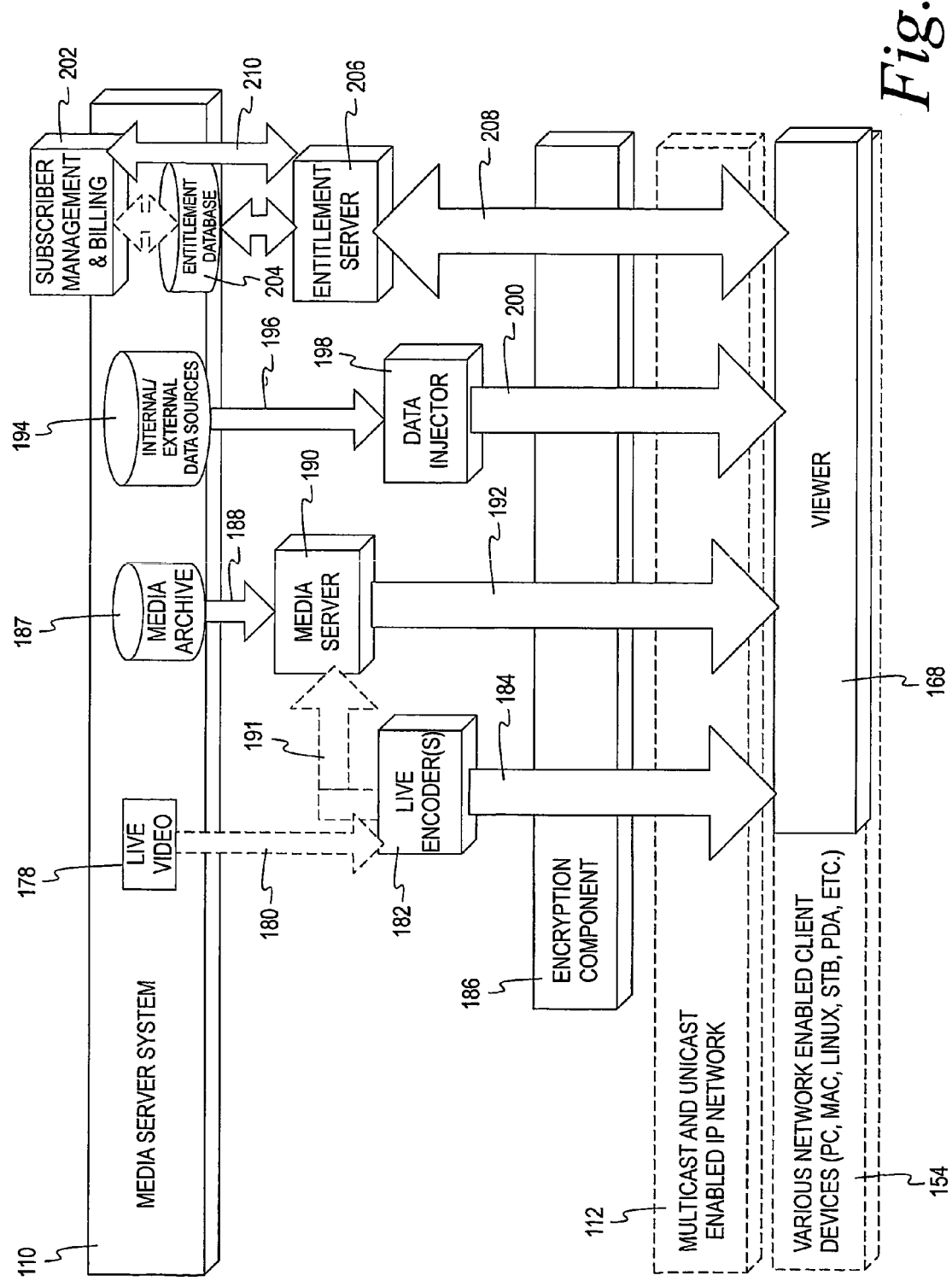
FIG. 13 is a block diagram showing information flow in a system according to one embodiment of the present invention.

Referring now to FIG. 13, a block diagram showing a viewing process according to one embodiment of the present invention is illustrated. After a viewer 168 has been downloaded to a client device and is executing within the client device 154, it is connected to the media server system 110 in one embodiment across a multicast-enabled if network 112. According to another embodiment of the present invention the IP network is a unicast network. The client viewer 168 has access to a variety of A/V streams from the media server system 110 including a live video source 178, e.g. set-top box, a video camera, DVD player or other live audio/video feed, which provides an analog A/V stream 180 to a live encoder 182. The live encoder 182 encodes the uncompressed A/V stream 180 into a digitally-encoded A/V stream 184 which is encrypted by an encryption component 186 for transmission over the IP network 112 and received by the client viewer 168. Another possible A/V source according to the embodiment shown in FIG. 13 is a selection of archived programs resident on a media archive 187 which supplies requested digitally-encoded A/V material 188 to a media server 190 which then provides a digitally encoded A/V stream 192 which is encrypted by an encryption device 186 for transmission over the IP network 112 to the client viewer 168. The media server module 190 may also accept a live stream 191 from the live encoder 182 and provide the live stream to the viewer 168 in unicast or multicast mode.

Additional functions beyond the presentation of recorded media may be incorporated into the system shown in FIG. 13. For example, internal and/or external data sources 194 may be accessed to provide a data flow 196 to a data injector module

198, which formats the data for display using a formatted data stream 200 to the viewer 168. As shown in FIG. 13, the formatted data stream 200 may be encrypted and provided over the IP network 112. Data from the internal and/or external data sources 194 may include data regarding the media available for viewing using the media server system 110, or other types of data specific to a particular deployment of the media server system. Examples of types of informational content include network services navigation data, electronic program guide data, interactive services, authorization information, conditional access entitlement information and commands, sports information, weather information, entertainment services, order confirmation information, financial information, news information, library card catalogs, user profiles, live ticker tapes, patient profiles, configuration data, URLs, menus, and the like. According to one embodiment of the present invention, distribution of such information in a multicast environment provides an efficient use of bandwidth for the distribution of information among client devices.

Subscriber management and billing functions may also be incorporated into the system shown in FIG. 13. In this embodiment, a subscriber management and billing module 202 may be provided on the media server system 110. The subscriber management and billing module 202 is adapted to forward information to and receive information from an entitlement database 204, including information on which devices are entitled to receive specific content from the media server system 110. The entitlement database, in turn, is adapted to forward information to and receive information from an entitlement server 206, which manages entitlements in the system. The entitlement server 206 is adapted to receive data from the viewer 168, such as information on which content the viewer is accessing, the amount of time spent accessing various types of content, messages, and other statistical and interactive data such as event selection, service upgrades, or ordering information. Further, as shown by the arrow 208, the entitlement server 206 is adapted to forward information regarding entitlement, control (e.g., termination message, entitlements) and other message content to the viewer 168 by secure and/or nonsecure means. In the embodiment shown in FIG. 13, the entitlement server 206 may directly exchange information with the subscriber management and billing module 202 to enable more direct management of entitlements and interactive messages or interactive purchase transactions as shown by the arrow 210.

Figure 14:
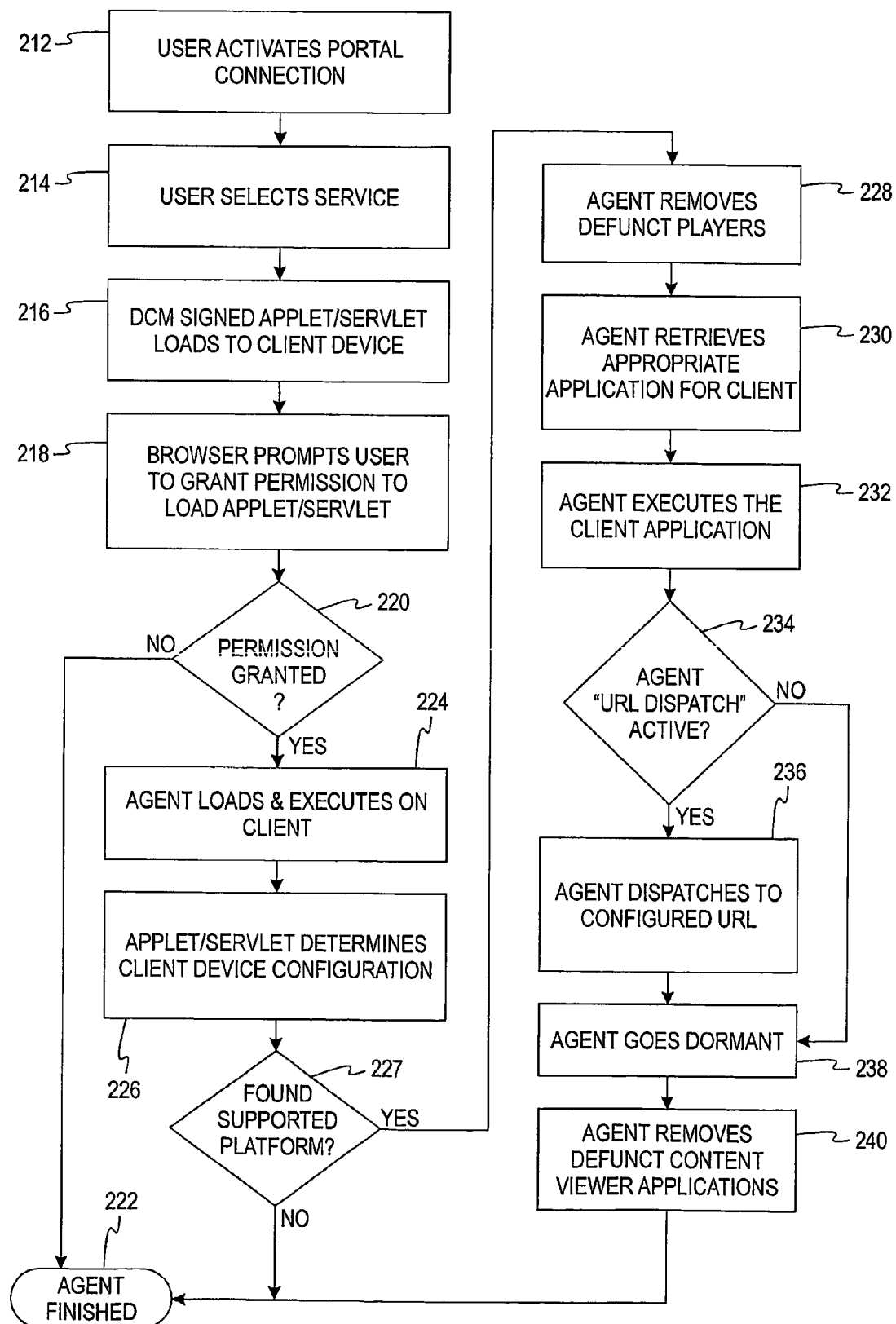
FIG. 14 is a flow diagram showing the provisioning of a media viewer to a client device according to one embodiment of the present invention.

Turning now to FIG. 14 a flow chart of interactions on a client device and a media server system 110 according to one embodiment of the invention is shown.

At step 212 a user activates a portal connection to the media server system 110 via a web browser on the client device and the media server system 110 presents a tune-in or watch-tv button or a menu of program content on a web page to the user. At step 214 the user selects an item from the menu or clicks on a "Watch" button presented by the media server portal. As shown at block 216, the media server system 110 then begins to load a signed applet to the client device. The browser may present a prompt requesting permission to load a signed applet or servlet as shown at block 218. If the user does not agree at decision block 220 to the download then control is passed to step 222 and the session is terminated. Otherwise, if the user accepts the signed applet for download, or if in the past the user has chosen to always accept this applet, then the media server agent 160 downloads on the client device at step 224. After the agent 160 is downloaded in the form of an applet, the agent then determines the configuration of the client device platform characteristics—for example, the Operating System, CPU, and similar platform characteristics—at step 226 and checks whether the platform is in it's list of supported platforms in decision 227. If the platform is not a supported platform, the agent terminates. If the platform is a supported platform, the agent removes any defunct media players from the client device at step 228. At step 230, the agent retrieves the appropriate client viewing application 168 from the media server system 110 and executes the downloaded viewing application 168 at step 232.

At step 234 a check is executed to determine if the agent is configured to dispatch the browser to a specific pre-configured URL (for example, to a support page or elsewhere). If the agent is configured to dispatch, as shown at block 236, then it dispatches to a predefined location. If the agent is not configured to dispatch to a specific URL, the agent becomes dormant as shown at step 238. At step 240 the agent 160 may remove any inactive viewing applications 168 and terminate.

Figure 15:
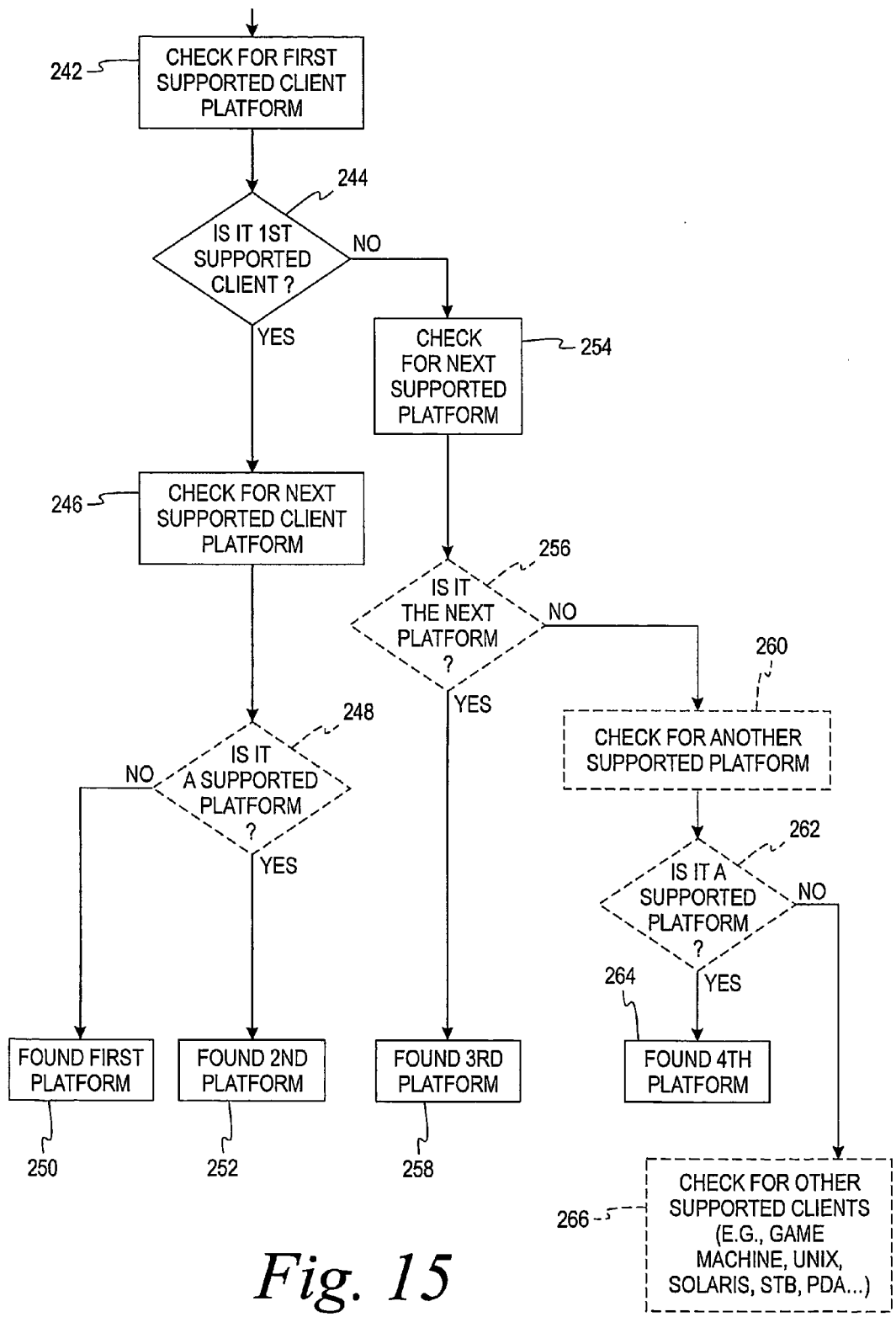
FIG. 15 is a flow diagram showing the determination of a device platform according to one embodiment of the present invention.

FIG. 15 is a flow chart showing the operation of determining a client device configuration as shown at block 226 of FIG. 14. The agent 160 first checks the client device for a first supported client platform, as shown at block 242. If it is determined as shown at decision block 244 that the first supported client exists on the client device, the agent 160 checks for a specific platform as shown at block 246. If at decision block 248, it is determined that the specific platform is not present, the agent determines that a first platform has been found as shown at block 250 in a default decision. If it is determined at decision block 248 that the specific platform is present, a second possible platform is deemed the correct platform as shown at block 252.

Returning to decision block 244, if the first supported client is not detected, the agent 160 moves on to check for a next supported platform as shown at block 254. Then, as shown at decision block 256, if the next platform is found on the client, the agent 160 determines that a third supported platform is the client's platform, as shown at block 258. If at decision block 256, the agent 160 determines that this next platform is not found on the client, the agent checks for another supported platform as shown at block 260. At decision block 262, the agent 160 determines whether the client platform is supported. If the client platform is supported, the agent 160 deems a fourth supported platform as the correct client platform as shown at block 264. If at decision block 262 the client platform is found to be unsupported, additional clients, such as a game machine, a UNIX client, a Solaris client, a set-top box, or a PDA may be checked as shown at block 266. According to one embodiment of the present invention, platforms to be determined according to the process shown in FIG. 15 may include platforms such as MAC-OS, LINUX, and Microsoft platforms as shown in FIG. 16.

Figure 16:
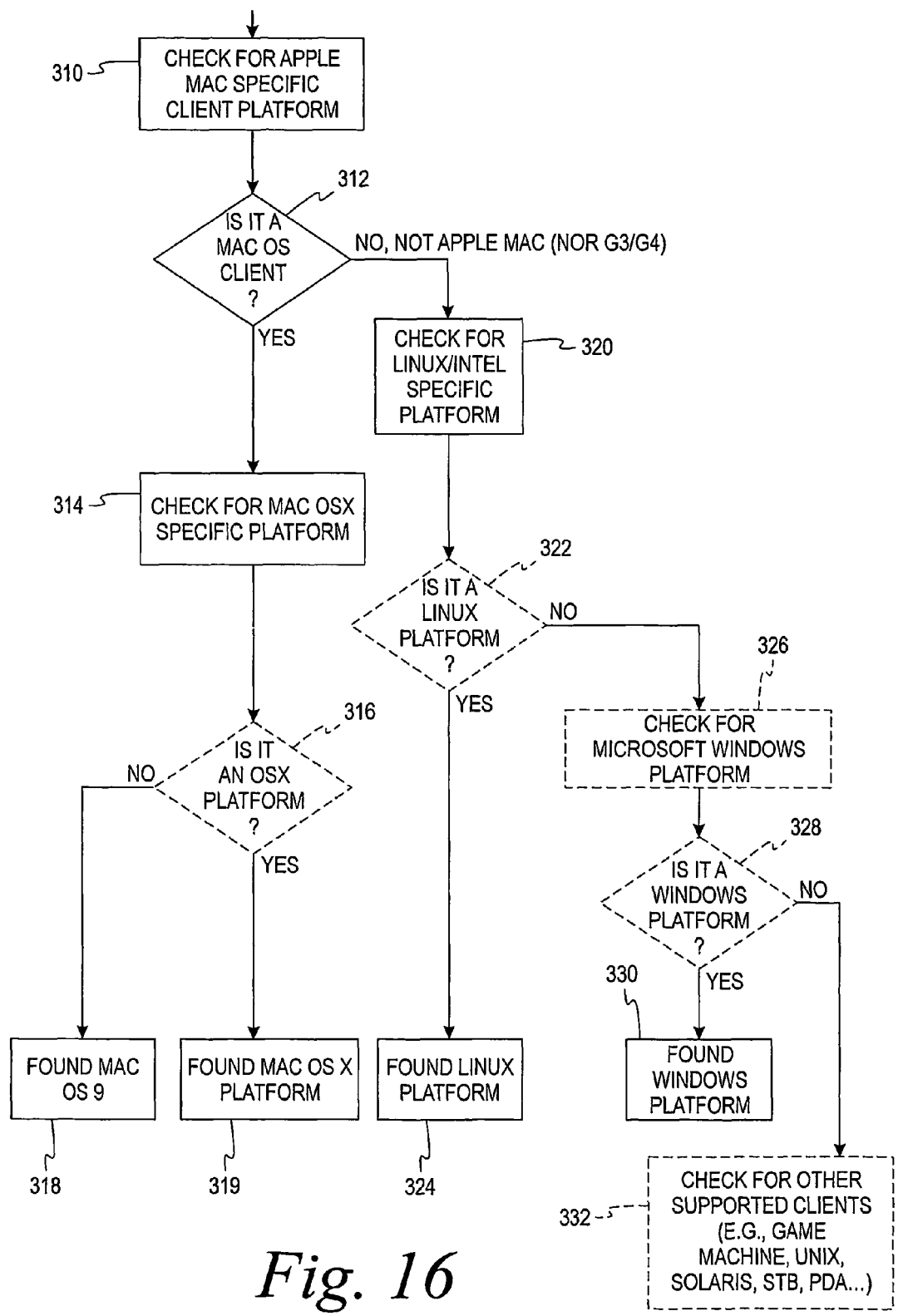
FIG. 16 is a flow diagram showing the determination of specific device platforms according to one embodiment of the present invention.

FIG. 16 is a flow chart showing the specific client platform determination process of one embodiment of the invention as shown at block 226 of FIG. 14. The agent 160 first checks the client device for Apple Macintosh client platform by trying to load a Mac unique Java class called "com.apple.mrj.MRJ-FileUtils" at block 310. If, as shown at decision block 312, it is determined that the device is an Apple™ Macintosh™ platform, the agent 160 checks for a specific type of Mac platform as shown at block 314 by attempting to load a Java 2 class called "java.util.Collection". If at decision block 316, it is determined that the "java.util.Collection" class loads, then it is determined to be a Mac OSX client as shown at block 319, and if not it is determined to be a Mac OS9 device as shown at block 318. Returning to decision block 312, if it is determined that the client is not a Macintosh platform, then the agent applet tests for a Linux type platform at block 320 by checking the file separator type in the system properties of the unknown OS to determine whether it is a UNIX/Linux type "/" and if so at 322 determines that it found a Linux platform block 324. If not, then a further test may be made at block 326, though this test may be considered optional and default to a result of determining that it must be a Microsoft Windows client platform at 330. If not, then further tests may commence to test for other supported platforms as shown at block 332.

Figure 17:
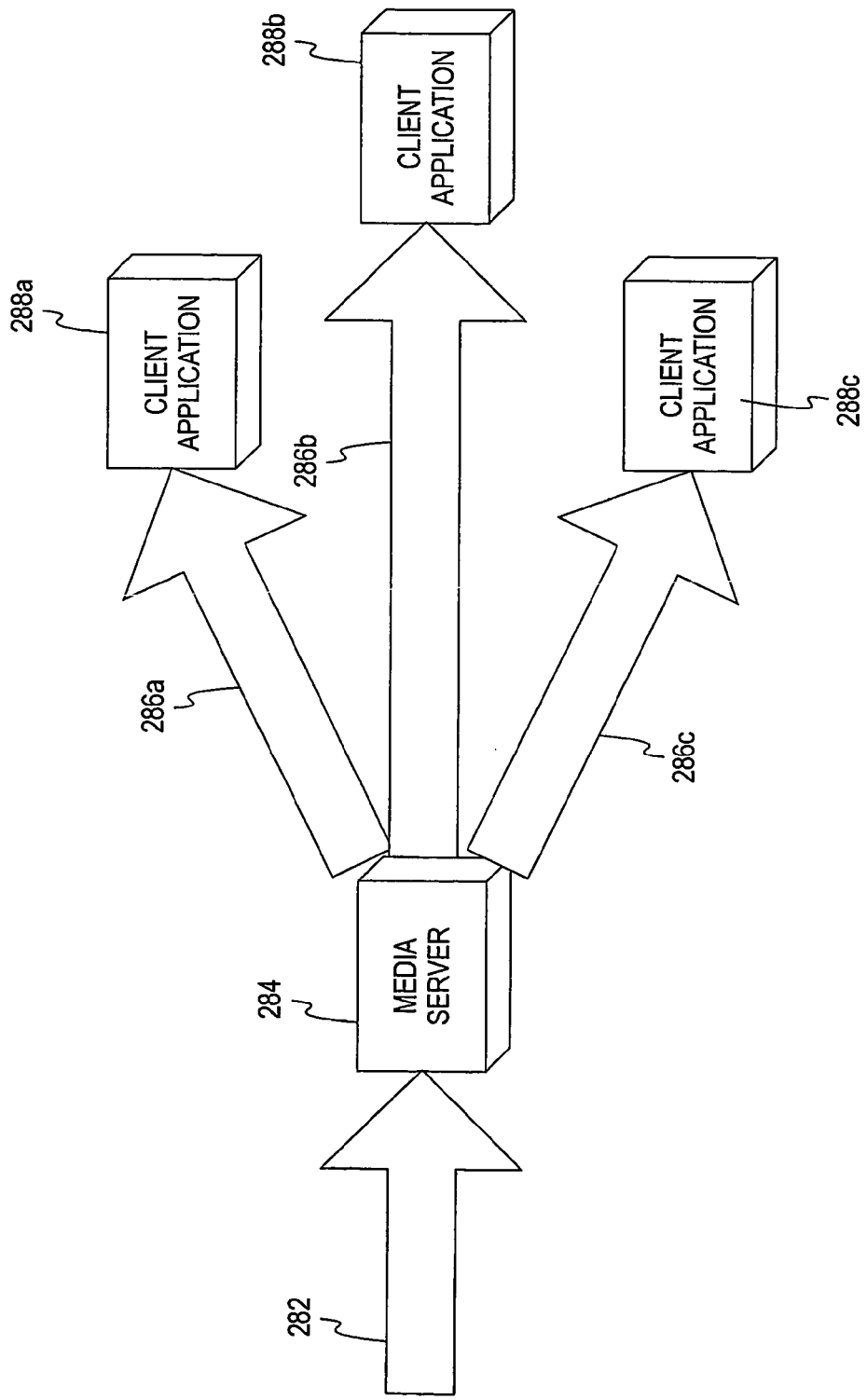
FIG. 17 is a block diagram showing media distribution in a unicast environment according to one embodiment of the present invention.

Some enterprise networks may only have certain portions of their network multi-cast enabled. FIG. 17 illustrates a method of using the present invention in non-multi-cast enabled networks according to one embodiment of the present invention. The source multicast streams 282 are redistributed by a media server 284 into unicast streams 286a, b, and c which are individually received by viewers 288a, b, and c. According to some embodiments of the invention, there is no difference in the viewers 168 used in a multicast network and viewers 288 used in the unicast network as shown in FIG. 17. In the unicast network there are as many streams as there are viewers 168, as the unicast UDP packets have only one specific viewer address per packet/stream 286. According to another embodiment of the present invention, the use of unicast streams 286 is used to implement special media requests as in a Video on Demand (VoD) scenario in which a user requests individual access to material stored in a library or database of stored A/V program source material.

Figure 18:
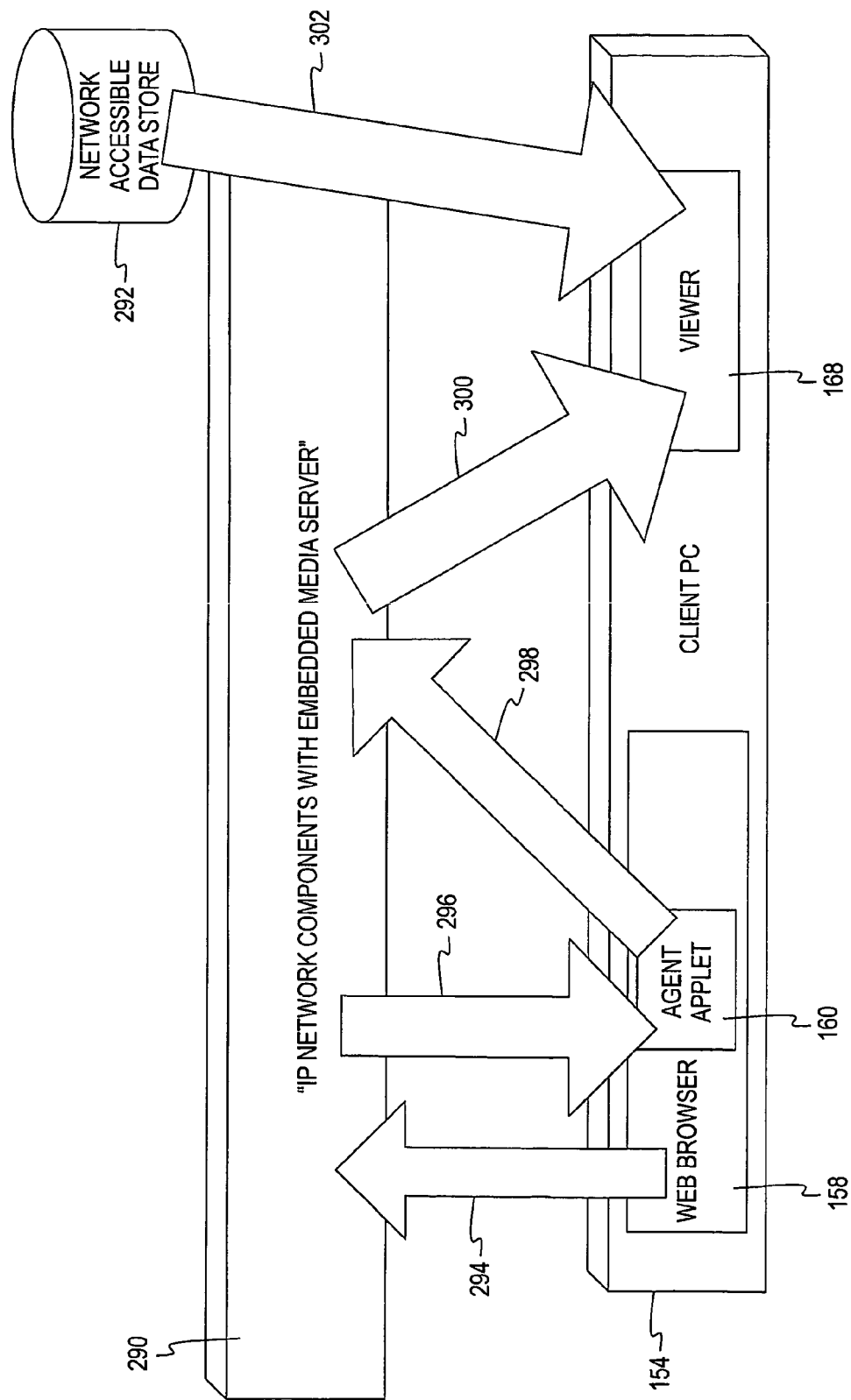
FIG. 18 is a block diagram showing the operation of a media distribution system according to one embodiment of the present invention.

Turning now to FIG. 18, a block diagram describing another embodiment and showing interactions between components in an embodiment of the present invention using network components (e.g., network switches or routers) containing embedded media server system functions is shown. A network-enabled device 154 interacts with a network 290 having hardware with embedded media server functions. The network equipment 290 may forward a viewer 168 either from the network equipment itself 290, which includes embedded media server system components, or from a network-accessible data store 292. Though the initial request for content from the network 290 may be made in a variety of ways, in the embodiment shown in FIG. 18, an HTTP or HTTPS request is made from the device 154 to the network 290 as shown by the arrow 294. Next, as shown in the embodiment of FIG. 18 by arrow 296, the network 290 responds to the request for content by forwarding an agent applet 160 from the network 290 to the device 154. The agent applet 160 executes in the device's runtime environment, determines the client environment, and retrieves the appropriate platform specific viewer from the network 290, as shown by the arrow 298. Next, as shown by the arrow 300, the agent applet 160 loads and executes on the client the viewer application designed for operation in the client environment and adapted to view the content requested from the network 290. As shown by the arrow 302, it is alternatively contemplated that the viewer 168 will be acquired by a datastore 292 accessible by the network 290. While the embodiment of FIG. 18 has been described with respect to the provisioning of a viewer in response to a request for media content, systems and methods according to the present invention may provide many types of applications adapted for use with different types of data. Further, applications to be provided using systems and methods according to the present invention may be provided within or outside a media server system, and may be provided using a variety of data storage and provisioning systems, such as a logical data carousel.

In addition to embodiments described above or in the accompanying claims, several embodiments of the present inventions will now be described.

Alternative Embodiment A

A system for enabling a user to view a content file through a client device, said client device having an environment including a central processing unit, an operating system and a browser, the system comprising:
 an electronic data network accessible by the browser of the client device;
 a client environment finder for determining the environment of the client device when the client device is in communication with the network;
 a viewer selector for selecting a content viewer compatible with the environment of the client device; and
 a viewer downloader for providing the selected content viewer to the client, wherein the client device uses the selected content viewer to view the content file received from the network.

Alternative Embodiment B

The system of alternative embodiment A, above, wherein the content file includes streamed audio-video.

Alternative Embodiment C

The system of alternative embodiment A, above, wherein the network is selected from the group consisting of: a multicast network, a unicast network, a unicast on demand network, an internet, and an intranet.

Alternative Embodiment D

The system of alternative embodiment C, above, wherein the content file includes streamed audio-video.

Alternative Embodiment E

The system of alternative embodiment A, above, wherein when the client device requests a web page from a server on the network, the server sends the web page including an applet through the network to the client device, wherein the applet includes the client environment finder.

Alternative Embodiment F

The system of alternative embodiment E, above, wherein when the client device requests a content file linked to said web page, the client environment file determines the environment of the client device, provides the determined client environment to the viewer selector, and causes the viewer selector to select a content viewer compatible with the environment of the client device.

Alternative Embodiment G

The system of alternative embodiment F, above, wherein applet includes the viewer selector.

Alternative Embodiment H

The system of alternative embodiment G, above, wherein the viewer selector includes a configuration file for determining the compatible viewer for the client device based on the environment of the client device.

Alternative Embodiment I

The system of alternative embodiment F, above, wherein applet includes the client environment finder.

Alternative Embodiment J

The system of alternative embodiment A, above, wherein the viewer selector includes a configuration file for determining the compatible viewer for the client device based on the environment of the client device.

Alternative Embodiment K

A system for enabling a user to view streamed audio-video media through a client device, said client device having an environment including a central processing unit, an operating system and a browser, the system comprising:
  an electronic data network accessible by the browser of the client device, wherein the network is selected from the group consisting of: a multicast network, a unicast network, a unicast on demand network, an internet and an intranet;
  a client environment finder for determining the environment of the client device when the client device is in communication with the network, wherein when the client device requests a web page from a server on the network, the server sends the web page including an applet through the network to the client device, wherein the applet includes the client environment finder;
  a viewer selector for selecting a content viewer compatible with the environment of the client device, wherein when the client device requests a content file linked to said web page, the client environment file determines the environment of the client device, provides the determined client environment to the viewer selector, and causes the viewer selector to select a content viewer compatible with the environment of the client device; and
  a viewer downloader for providing the selected content viewer to the client, wherein the client device uses the selected content viewer to view the streamed audio-video media received from the network.

Alternative Embodiment L

The system of alternative embodiment K, above, wherein the applet includes the viewer selector.

Alternative Embodiment M

The system of alternative embodiment K, above, wherein the viewer selector includes a configuration file for determining the compatible viewer for the client device based on the environment of the client device.

Alternative Embodiment N

The system of alternative embodiment L, above, wherein the applet includes the client environment finder.

Alternative Embodiment O

The system of alternative embodiment K, above, wherein the viewer selector includes a configuration file for determining the compatible viewer for the client device based on the environment of the client device.

Alternative Embodiment P

A system for enabling a user to view a content file through a client device, said system comprising:
  an electronic data network;
  a storage device accessible though said network and including a plurality of different content viewers, each for enabling one of a plurality of client devices with different environments to view the content file;
  means for determining the environment of the client device of the user;
  means for selecting a content viewer from the plurality of content viewers compatible with the environment of the client device of the user; and
  means for downloading the selected content viewer to the client device.

Alternative Embodiment Q

A system for enabling a user to view audio-video media, the system comprising:
  an electronic data network adapted to provide at least one audio-video media;
  at least one client device adapted to communicate with said network, the client device having a hardware and software environment; and
  a content viewer accessible through the network and adapted to be downloaded to the client device through the network, the content viewer compatible with the environment of the client device and selected from a plurality of content viewers accessible through the network which are compatible with client devices having different hardware and software environments.

Alternative Embodiment R

A method for enabling a user to view content through a client device selected from a plurality of client devices which are adapted to communicate with a network, wherein each client device has an environment including a central processing unit, an operating system and a browser for accessing said network, said method comprising the steps of:
  determining the environment of the user's client device including the central processing unit, operating system and browser of said client device;
  selecting a viewer compatible with the determined environment of the user's client device from a plurality of viewers accessible though the network which each enable one of the plurality of client devices with different environments to view content; and
  downloading the selected viewer to the user's client device.

Alternative Embodiment S

The method of alternative embodiment R, above, which includes receiving a request from the user's client device for content from a plurality of different content.

Alternative Embodiment T

A method for enabling a client device to play a content file obtained through an electronic data network, the client device having a hardware and software environment, the method comprising the steps of:

selecting and initializing through the network a content viewer compatible with the environment of the client device from a plurality of content viewers which are each compatible with one of a plurality of client devices having different environments;

executing the content viewer on the client device; and deleting the content viewer from the client device upon a termination event occurring on the client device.

Alternative Embodiment U

The method of alternative embodiment T, above, wherein the step of initializing the content viewer compatible with the environment of the client device includes:

the client device requesting a web page from a server on the network;

the server sending the web page through the network to the client device, said web page including an applet;

the client device requesting from a server on the network a content file linked to the web page;

determining the hardware and software environment of the client device;

selecting said content viewer compatible with hardware and software environment of the client device; and providing the content viewer to the client device through the network.

Alternative Embodiment V

The method of alternative embodiment U, above, wherein the applet determines the hardware and software environment of the client device.

Alternative Embodiment W

The method of alternative embodiment U, above, wherein the applet selects said content viewer compatible with the hardware and software environment of the client device.

Alternative Embodiment X

The method of alternative embodiment U, above, which includes the step of stopping initialization if the client device does not support the applet.

Alternative Embodiment Y

The method of alternative embodiment U, above, wherein the step of selecting a content viewer compatible with the hardware and software environment of the client device includes the applet reading a configuration file from a server in communication with the network.

Alternative Embodiment Z

The method of alternative embodiment T, above, which includes the step of requesting the selected content viewer from a server in communication with the network.

Alternative Embodiment AA

The method of alternative embodiment T, above, wherein the step of executing the content viewer includes:

determining whether a content viewer has been downloaded to the client device;

stopping execution of the media file viewer if a previously downloaded content viewer is playing on the client device;

continuing execution of the content viewer if a previously downloaded content viewer is not playing on the client device;

deleting any previously downloaded content viewer not playing on the client device;

downloading from a server in communication with the network the selected content viewer compatible with the environment of the client device;

writing the downloaded content viewer to the client device;

instructing the client device to execute the downloaded content viewer; and executing the downloaded content viewer on the client device.

Alternative Embodiment AB

The method of alternative embodiment AA, above, wherein the applet performs all the steps except executing the downloaded content viewer.

Alternative Embodiment AC

The method of alternative embodiment AA, above, which includes determining if user authorization is required to download the selected content viewer.

Alternative Embodiment AD

The method of alternative embodiment AC, above, which includes an applet performing the required authorization.

Alternative Embodiment AE

The method of alternative embodiment AA, above, which includes the step of making the viewer executable if the environment of the client device is UNIX.

Alternative Embodiment AF

The method of alternative embodiment AA, above, wherein the step of deleting the content viewer from the client device upon a termination event, including deleting the content viewer from the client device, and cleaning an allocated resource from the client device.

Alternative Embodiment AG

The method of alternative embodiment AF, above, which includes the steps of instructing an applet to stop the content viewer and delete the content viewer from the client device.

Alternative Embodiment AH

The method of alternative embodiment AF, above, wherein the applet deletes the content viewer from the client device.

Alternative Embodiment A

The method of alternative embodiment AF, above, wherein the applet cleans an allocated resource from the client device.

Alternative Embodiment AJ

A method for enabling a client device adapted to communicate with an electronic data network to play a content file, the client device having an environment including hardware and software, the method comprising the steps of:
selecting and providing through the network a content viewer compatible with the environment of the client device from a plurality of content viewers which are each compatible with one of a plurality of client devices having different environments;
initializing the content viewer on the client device;
executing the content viewer on the client device; and
deleting the content viewer from the client device upon a termination event.

Alternative Embodiment AK

The method of alternative embodiment AJ, above, wherein the step of initializing the content viewer includes:
the client device requesting through the network a web page from a server;
the server sending the web page through the network to the client device, the web page including an applet;
the client device requesting from a server in communication with the network a content file linked to the web page;
reading the environment of the client device;
selecting a content viewer compatible with environment of the client device; and
providing the selected content viewer to the client device.

Alternative Embodiment AL

The method of alternative embodiment AK, above, wherein the applet reads the environment of the client device.

Alternative Embodiment AM

The method of alternative embodiment AK, above, wherein the applet selects a content viewer compatible with the environment of the client device.

Alternative Embodiment AN

The method of alternative embodiment AK, above, which includes the step of aborting initialization if the client device does not support the applet.

Alternative Embodiment AO

The method of alternative embodiment AM, above, wherein the step of selecting a content viewer compatible with the environment of the client device includes the applet reading a configuration file.

Alternative Embodiment AP

The method of alternative embodiment AK, above, which includes requesting the selected content viewer from a server in communication with the network.

Alternative Embodiment AQ

The method of alternative embodiment AP, above, wherein the applet requests the selected content viewer from a server in communication with the network.

Alternative Embodiment AR

The method of alternative embodiment AJ, above, wherein the step of executing the content viewer includes:
determining whether a content viewer has been downloaded to the client device;
stopping execution of the media file viewer if a previously downloaded content viewer is playing on the client device;
continuing execution of the content viewer if a previously downloaded content viewer is not playing on the client device;
deleting any previously downloaded content viewer not playing on the client device;
downloading from a server in communication with the network the selected content viewer compatible with the environment of the client device;
writing the downloaded content viewer to the client device;
instructing the client device to execute the downloaded content viewer; and
executing the downloaded content viewer on the client device.

Alternative Embodiment AS

The method of alternative embodiment AR, above, wherein the applet performs all the steps except executing the downloaded content viewer.

Alternative Embodiment AT

The method of alternative embodiment AR, above, which includes determining if user authorization is required to download the selected content viewer to the client device.

Alternative Embodiment AU

The method of alternative embodiment AT, above, which includes an applet performing the required authorization.

Alternative Embodiment AV

The method of alternative embodiment AR, above, which includes the step of making the viewer executable if the environment of the client device is UNIX.

Alternative Embodiment AW

The method of alternative embodiment AR, above, wherein the step of deleting the content viewer from the client device upon a termination event, including deleting the content viewer from the client device, and cleaning an allocated resource from the client device.

Alternative Embodiment AX

The method of alternative embodiment AW, above, which includes the steps of instructing an applet to stop the content viewer and delete the content viewer from the client device.

Alternative Embodiment AY

A method for enabling a client device to play a content file, said client device having an environment of hardware and software, the method comprising the steps of:
establishing communication between the client device and a network;
the client device initializing a content viewer received through the network which is compatible with the client device environment from a plurality of content viewers which are each compatible with one of a plurality of client devices having different environments;

executing the content viewer on the client device; and deleting the content viewer from the client device upon a termination event.

Alternative Embodiment AZ

The method of claim AY, wherein the step of executing the content viewer includes:

determining whether a content viewer has been downloaded to the client device;

stopping execution of the media file viewer if a previously downloaded content viewer is playing on the client device;

continuing execution of the content viewer if a previously downloaded content viewer is not playing on the client device;

deleting any previously downloaded content viewer not playing on the client device;

downloading from a server in communication with the network the selected content viewer compatible with the client device environment;

writing the downloaded content viewer to the client device;

instructing the client device to execute the downloaded content viewer; and executing the downloaded content viewer on the client device.

Alternative Embodiment BA

The method of alternative embodiment AZ, above, wherein the applet performs all the steps except executing the downloaded content viewer.

Alternative Embodiment BB

The method of alternative embodiment AZ, above, which includes determining if client device authorization is required to download the selected content viewer.

Alternative Embodiment BC

The method of alternative embodiment BB, above, which includes an applet performing the required authorization.

Alternative Embodiment BD

The method of alternative embodiment AZ, above, which includes the step of making the viewer executable if the client device environment is UNIX.

Alternative Embodiment BE

A method for enabling a client device to play a content file, said client device having an environment, the method comprising the steps of:

selecting and initializing through a network a content viewer compatible with the client device environment selected from a plurality of content viewers which are each compatible with one of a plurality of client devices having different environments providing content to the client device through the network executing the content viewer to view content provided through the network;

deleting the content viewer from the client device upon a termination event.

Alternative Embodiment BF

The method of alternative embodiment BE, above, wherein the step of deleting the content viewer from the client upon a termination event includes deleting the content viewer, and cleaning an allocated client device resource.

Alternative Embodiment BG

The method of alternative embodiment BF, above, which includes the steps of instructing an applet to stop the content viewer and delete the content viewer from the client device.

Alternative Embodiment BH

The method of alternative embodiment BG, above, wherein the applet deletes the content viewer from the client device.

Alternative Embodiment BI

The method of alternative embodiment BG, above, wherein the applet cleans an allocated client device resource.

While particular embodiments and applications of the present invention have been illustrated and described, it is to be understood that the invention is not limited to the precise construction and compositions disclosed herein and that various modifications, changes, and variations may be apparent from the foregoing descriptions. For example, systems and methods according to the present invention may be provided for purposes other than to present audio and render video. For example, spread sheets, word processors, games, and other types of software may be provided when content specific to those types of software is requested. Such embodiments are contemplated as being included in the present invention without departing from the spirit and scope of the invention as defined in the appended claims.

What is claimed is:

1. A method for delivering an application from a web server to a device, said method comprising:

receiving a request for content from the device by said web server, said content comprising audio/video content and informational services content;

delivering an agent program to a memory of said device, wherein a processor of said device executes said agent program in a runtime environment on said device;

receiving information from said agent program regarding a platform of said device;

delivering a platform specific native mode application to said device, wherein said platform specific native mode application allows said content to be displayed to a user and executes on said platform of said device; and receiving and logging statistical event data from the device, said statistical and event data comprising information on the content accessed by the device.

2. The method of claim 1, wherein receiving a request for content comprises receiving an HTTP or HTTPS request.

3. The method of claim 1, wherein said runtime environment is a JAVA™ runtime environment.

4. The method of claim 1 wherein, sending said agent program to said device comprises sending said agent program over an Internet Protocol network.

5. The method of claim 1 further comprising delivering content usable with said platform specific application to said device following the delivery of the platform specific application to the device.

6. The method of claim 5 further comprising providing access to said content only to devices having proper entitlement to said content.

7. The method of claim 1, wherein delivering said content comprises delivering said content using multicast User Datagram Protocol.

8. The method of claim 1, wherein said content is selected from the group consisting of network services navigation data, electronic program guide data, entertainment services, interactive services, authorization information, order confirmation, conditional access entitlement information and commands, sports information, weather information, financial information, news information, and configuration data.

9. The method of claim 1, wherein receiving and logging statistical and event data comprises receiving said statistical and event data over a UDP/IP network.

10. A system for providing and displaying media content from a network on a client device, said system comprising:

a media server system for receiving media content and for encoding said media content for delivery over a data network, said media server system comprising a processor for executing an agent provisioning component of said media server system; and one or more devices connected to said media server system via said network and said one or more devices for sending a request for said media content to said media server system, said one or more devices executing a runtime environment;

said agent provisioning component of said media server system responding to said request for said media content by delivering an agent program for execution by a processor within said runtime environment of said one or more devices, said agent program determining platforms of said one or more devices and sending information regarding said platforms to said media server system, said media server system responding to said information regarding said platforms by sending a native-mode binary media viewer application to said one or more devices and delivering an encoded media stream to be displayed on said one or more devices using said native-mode binary media viewer application, wherein delivering said encoded media stream comprises delivering a media stream having audio/video content and informational services content, and wherein said media server system receives and logs statistical and event data from one or more of said devices, said statistical and event data comprising information regarding the content accessed by the device.

11. The system of claim 10 wherein said request for said media content is an HTTP or HTTPS request.

12. The system of claim 10 wherein said runtime environment is a JAVA™ runtime environment.

13. The system of claim 10 wherein said network is an Internet Protocol network.

14. The system of claim 10, wherein said informational services content is selected from the group consisting of network services navigation data, entertainment services, electronic program guide data, interactive services, authorization information, conditional access entitlement information and commands, sports information, weather information; financial information, news information, and configuration data.

15. The system of claim 10, wherein said media server system transmits said informational services content over a UDP/IP network.

16. The system of claim 10, wherein said media server system receives said statistical and event data over a UDP/IP network.

17. The system of claim 10 wherein said media server system provides said encoded media stream only to devices having proper entitlement to said encoded media stream.

18. A method for accessing media from a media server system using a device, said method comprising:

requesting from within a runtime environment on said device media content from a selection of content sources, said content comprising audio/video content and informational services content;

downloading an agent applet to a memory of said device for execution by a processor in said runtime environment, said agent applet identifying a platform of said device;

sending to said media server system information regarding said platform of said device;

receiving from said media server system a native-mode application for execution on said platform of said device;

receiving a media stream from said media server system, and using said native-mode application to decode said media stream and to provide said requested media content on said platform of said device; and providing statistical event data to said media server system, said statistical and event data comprising information on the content accessed by the device.

* * * * *